US011412262B2

(12) United States Patent
Egilmez et al.

(10) Patent No.: US 11,412,262 B2
(45) Date of Patent: Aug. 9, 2022

(54) NONLINEAR EXTENSIONS OF ADAPTIVE LOOP FILTERING FOR VIDEO CODING

(71) Applicant: QUALCOMM Incorporated, San Diego, CA (US)

(72) Inventors: Hilmi Enes Egilmez, San Diego, CA (US); Nan Hu, San Diego, CA (US); Vadim Seregin, San Diego, CA (US); Marta Karczewicz, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 16/909,603

(22) Filed: Jun. 23, 2020

(65) Prior Publication Data

US 2020/0404335 A1 Dec. 24, 2020

Related U.S. Application Data

(60) Provisional application No. 62/865,779, filed on Jun. 24, 2019.

(51) Int. Cl.
H04N 19/70 (2014.01)
H04N 19/17 (2014.01)
H04N 19/117 (2014.01)
H04N 19/64 (2014.01)

(52) U.S. Cl.
CPC ........... H04N 19/70 (2014.11); H04N 19/117 (2014.11); H04N 19/17 (2014.11); H04N 19/64 (2014.11)

(58) Field of Classification Search
CPC ........ H04N 19/70; H04N 19/17; H04N 19/64; H04N 19/117; H04N 19/82
See application file for complete search history.

(56) References Cited

U.S. PATENT DOCUMENTS

| 10,681,380 | B2* | 6/2020 | Terada | H04N 19/109 |
| 10,708,622 | B2* | 7/2020 | Budagavi | H04N 19/82 |
| 2013/0156097 | A1* | 6/2013 | Budagavi | H04N 19/82 |
| | | | | 375/240.02 |
| 2013/0322530 | A1* | 12/2013 | Rossato | H04N 19/33 |
| | | | | 375/240.12 |
| 2018/0184123 | A1* | 6/2018 | Terada | H04N 19/61 |

(Continued)

OTHER PUBLICATIONS

"Adaptive Loop Filtering for Video Coding"; Chia-Yang Tsai, Member, IEEE, Ching-Yeh Chen, Tomoo Yamakage, In Suk Chong, Yu-Wen Huang, Chih-Ming Fu, Takayuki Itoh, Takashi Watanabe, Takeshi Chujoh, Marta Karczewicz, and Shaw-Min Lei, Fellow, IEEE; 6, Dec. 2013 (Year: 2013).*

(Continued)

Primary Examiner — Jared Walker
(74) Attorney, Agent, or Firm — Shumaker & Sieffert, P.A.

(57) ABSTRACT

A video coder may be configured to code video data by performing adaptive loop filtering processes. A video coder may decode a syntax element that indicates a manner in which to perform an adaptive loop filtering process, the syntax element indicating that a nonlinear operation is to be applied to the video data, where the nonlinear operation is configured to be applied in combination with a filtering operation of the adaptive loop filtering process. In addition, the video coder may perform the adaptive loop filtering process based on the syntax element.

34 Claims, 17 Drawing Sheets

(56) References Cited

U.S. PATENT DOCUMENTS

2020/0314423 A1 10/2020 Hu et al.
2020/0344494 A1 10/2020 Hu et al.

OTHER PUBLICATIONS

Bross B., et al., "Versatile Video Coding (Draft 5)", Joint Video Experts Team (JVET) of ITU-T SG 16 WP 3 and ISO/IEC JTC 1/SC 29/WG 11, JVET-N1001-v5, 14th Meeting: Geneva, CH, Mar. 19, 2019-Mar. 27, 2019, No. JVET-N1001, May 14, 2019 (May 14, 2019), XP030205193, 370 pages, Retrieved from the Internet: URL:http://phenix.int-evry.fr/jvet/doc_end_user/documents/14_Geneva/wg11/JVET-N1001-v5.zip JVET-N1001-v5.docx, [retrieved on May 14, 2019].

Bross et al., "Versatile Video Coding (Draft 5)", Joint Video Experts Team (JVET) of ITU-T SG 16 WP 3 and ISO/IEC14 UTC 1/5C 29/WG 11, 14th Meeting: Geneva, CH, Mar. 19-27, 2019, JVET-N1001-v8, 399 Pages, XP030212626, Retrieved from the Internet: URL: http://phenix.int-evry.fr/mpeg/doc_end_user/documents/126_Geneva/wg11/m48053JVET-N1001-v8-JVET-N1001-v8.zip. JVET-N1001-v8.docx. [retrieved on Jun. 11, 2019].

Chen J., et al., "Algorithm Description for Versatile Video Coding and Test Model 3 (VTM 3)," 12, JVET Meeting, Oct. 3, 2018-Oct. 12, 2018, Macao, CN; The Joint Video Exploration Team of ISO/IEC JTC1/SC29/WG11 and ITU-T SG.16), No. JVET-L1002-v1, Dec. 24, 2018 (Dec. 24, 2018), XP030200768, Retrieved from the Internet: URL: http://phenix.int-evry.fr/jvet/doc_end_user/documents/12_Macao/wg11/JVET-L1002-v2.zip JVET-L1002-v2.docx [retrieved on Dec. 24, 2018] 48 pages.

Chen J., et al., "Algorithm Description for Versatile Video Coding and Test Model 4 (VTM 4)," 13, JVET Meeting, Jan. 9, 2019-Jan. 18, 2019, Marrakech, MA (The Joint Video Exploration Team of ISO/IEC JTC1/SC29/WG11 and ITU-T SG.16), No. JVET-M1002, Mar. 19, 2019 (Mar. 19, 2019), XP030255391, 62 pages, Retrieved from the Internet: URL:http://phenix.int-evry.fr/jvet/doc_end_user/documents/13_Marrakech/wg11/JVET-M1002-v2.zip JVET-M1002-v2.docx [retrieved on Mar. 19, 2019].

Chen J., et al., "Algorithm Description of Joint Exploration Test Model 1", 1, JVET Meeting, Oct. 19-21, 2015, Geneva, CH (The Joint Video Exploration Team of ISO/IEC JTC1/SC29/WG11 and ITU-T SG.16); URL: http://phenix.int-evry.fr/jvet/, No. JVET-A1001, Feb. 24, 2016 (Feb. 24, 2016), XP030150000, 27 Pages.

International Search Report and Written Opinion—PCT/US2020/039392—ISA/EPO—dated Oct. 5, 2020.

JVET: "VTM-5.0, Tags, JVET/VVCSoftware_VTM, GitLab", Frank Bossen, htttps://vcgit.hhi.fraunhofer.de/jvet/VVCSoftware_VTM/-/tags/VTM-5.0, pp. 1-3.

Taquet (Canon) J., et al., "Non-CE5: Complementary Results of Tests CE5-3 on Non-Linear ALF," 14. JVET Meeting; Mar. 19, 2019-Mar. 27, 2019, Geneva, CH (The Joint Video Exploration Team of ISO/IEC JTC1/SC29/WG11 and ITU-T SG.16), No. JVET-N0243, Mar. 21, 2019 (Mar. 21, 2019), XP030255993, 10 pages, Retrieved from the Internet: URL: http://phenix.int-evry.fr/jvet/doc_end_user/documents/14_Geneva/wg11/JVET-N0243-v3.zip JVET-N0243v2.0_clean.docx [retrieved on Mar. 21, 2019].

U.S. Appl. No. 15/931,110, filed May 13, 2020.
U.S. Appl. No. 16/897,049, filed Jun. 9, 2020.

Wan S., et al., "CE13-related: Integrated in-loop Filter Based on CNN," 14. JVET Meeting, Mar. 19, 2019-Mar. 27, 2019; Geneva, CH (The Joint Video Exploration Team of ISO/IEC JTC1/SC29/WG11 and ITU-T SG.16), No. JVET-N0133, Mar. 17, 2019 (Mar. 17, 2019), XP030255212, 7 pages, Retrieved from the Internet: URL:http://phenix.int-evry.fr/jvet/doc_end_user/documents/14_Geneva/wg11/JVET-N0133-v2.zip JVET-N0133-v2.docx [retrieved on Mar. 17, 2019].

Wang Y., et al., "CE13: Dense Residual Convolutional Neural Network based In-Loop Filter (Test 2.2 and 2.3)," 14. JVET Meeting; Jan. 9, 2019-Jan. 18, 2019; Geneva, (The Joint Video Exploration Team of ISO/IEC JTC1/SC29/WG11 and ITU-T SG.16 ) No. JVET-N0254, Mar. 13, 2019 (Mar. 13, 2019), XP030254764, 5 pages, Retrieved from the Internet: URL:http://phenix.int-evry.fr/jvet/doc_end_user/documents/14_Geneva/wg11/JVET-N0254-v1.zip JVET-N0254-v1.docx [retrieved on Mar. 13, 2019].

Yao (Hikvision) J., et al, "CE13-2.1: Convolutional Neural Network Filter (CNNF) for Intra Frame", 14. JVET Meeting; Mar. 19, 2019-Mar. 27, 2019, Geneva, (The Joint Video Exploration Team of ISO/IEC JTC1/SC29/WG11 and ITU-T SG.16), No. JVET-N0169, Mar. 16, 2019 (Mar. 16, 2019), XP030255119, 8 pages, Retrieved from the Internet: URL:http://phenix.int-evry.fr/jvet/doc_end_user/documents/14_Geneva/wg11/JVET-N0169-v3.zip JVET-N0169.docx [retrieved on Mar. 16, 2019].

Yin (Intel) H., et al., "AHG9: Adaptive Convolutional Neural Network Loop Filter", 13, JVET Meeting; Jan. 9, 2019-Jan. 18, 2019, Marrakech; (The Joint Video Exploration Team of ISO/IEC JTC1/SC29/WG11 and ITU-T SG.16 ), No. JVET-M0566, Jan. 13, 2019 (Jan. 13, 2019), XP030253871, 9 pages, Retrieved from the Internet: URL: http://phenix.int-evry.fr/jvet/doc_end_user/documents/13_Marrakech/wg11/JVET-M0566-v3.zip JVET-M0566-v3.docx [retrieved on Jan. 13, 2019].

Yin (Intel) H., et al., "CE13-1.2: Adaptive Convolutional Neural Network Loop Filter", 14. JVET Meeting; Mar. 19, 2019-Mar. 27, 2019, Geneva (The Joint Video Exploration Team of ISO/IEC JTC1/SC29/WG11 and ITU-T SG.16 ), No. JVET-N0480, Mar. 13, 2019 (Mar. 13, 2019), XP030254968, 4 pages, Retrieved from the Internet: URL: http://phenix.int-evry.fr/jvet/doc_end_user/documents/14_Geneva/wg11/JVET-N0480-v1.zip JVET-N0480.docx [retrieved on Mar. 13, 2019].

International Preliminary Report on Patentability from International Application No. PCT/US2020/039392, dated Jan. 6, 2022, 13 pp.

* cited by examiner

Diagonal

NONLINEAR EXTENSIONS OF ADAPTIVE LOOP FILTERING FOR VIDEO CODING

This application claims the benefit of U.S. Provisional Patent Application No. 62/865,779, filed Jun. 24, 2019, the entirety of which is hereby incorporated by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for nonlinear extension for adaptive loop filtering and presents several examples for adaptive loop filter (ALF) designs. The disclosure describes techniques for implementing adaptive loop filters in video coding applications. In particular, the disclosed techniques relate to the nonlinear extension of various adaptive loop filtering processes that may be performed during video coding (e.g., video encoding and/or video decoding). In some examples, a filter may relate to an adaptive loop filter (ALF) design that includes implementation of one or more nonlinear operators. In an example, a video coder (e.g., video encoder and/or video decoder) may advantageously encode and/or decode syntax elements that define parameters and/or operations of a particular adaptive loop filter used during a video coding process. The video coder may implement the adaptive loop filter by applying various nonlinear operations to a set of incoming samples prepared for the filtering process. In an example, the video coder may apply a nonlinear operation during an adaptive loop filtering process.

In some examples, a video coder may perform the adaptive loop filtering techniques of this disclosure during various stages of a video coding process. In an illustrative example, the video coder may apply an adaptive loop filter as including filtering operation followed and/or preceded by a nonlinear operation based on samples output from a quantization process. In turn, the video coder may output the filtered samples to a decoded picture buffer (DPB) for further processing. One or more combinations of techniques of this disclosure may improve coding efficiency, and may be used in advanced video codecs and next generation video coding standards, such as extensions of HEVC (High Efficiency Video Coding), H.266/Versatile Video Coding (VVC), or may be used in any future video coding standards.

In one example, an apparatus for decoding video data is disclosed, the apparatus comprising: a memory configured to store the video data; and one or more processors implemented in circuitry and configured to: decode a syntax element that indicates a manner in which to perform an adaptive loop filtering process, the syntax element indicating that a nonlinear operation is to be applied to the video data, the nonlinear operation configured to be applied in combination with a filtering operation of the adaptive loop filtering process; and perform the adaptive loop filtering process based on the syntax element.

In another example, a method of decoding video data is disclosed, the method comprising: decoding a syntax element that indicates a manner in which to perform an adaptive loop filtering process, the syntax element indicating that a nonlinear operation is to be applied to the video data, the nonlinear operation configured to be applied in combination with a filtering operation of the adaptive loop filtering process; and performing the adaptive loop filtering process based on the syntax element.

In another example, an apparatus for encoding video data is disclosed, the apparatus comprising: a memory configured to store the video data; and one or more processors implemented in circuitry and configured to: determine a nonlinear operation and a filtering operation to perform in an adaptive loop filtering process; perform the adaptive loop filtering process by applying the filtering operation and the nonlinear operation to the video data; and encode a syntax element that indicates a manner in which the adaptive loop filtering process was performed.

In another example, an apparatus for decoding video data is disclosed, the apparatus including: means for decoding a syntax element that indicates a manner in which to perform an adaptive loop filtering process, the syntax element indicating that a nonlinear operation is to be applied to the video data, the nonlinear operation configured to be applied in combination with a filtering operation of the adaptive loop filtering process; and means for performing the adaptive loop filtering process based on the syntax element.

In another example, a non-transitory computer-readable storage medium is disclosed, the non-transitory computer-readable storage medium having stored thereon instructions that, when executed, cause one or more processors to: decode a syntax element that indicates a manner in which to perform an adaptive loop filtering process, the syntax element indicating that a nonlinear operation is to be applied to video data in combination with a filtering operation; and perform the adaptive loop filtering process based on the syntax element.

The details of one or more examples are set forth in the accompanying drawings and the description below. Other features, objects, and advantages of the techniques of the disclosure will be apparent from the description, drawings, and claims.

BRIEF DESCRIPTION OF DRAWINGS

Like reference characters denote like elements throughout the description and figures.

DETAILED DESCRIPTION

Figure 1:
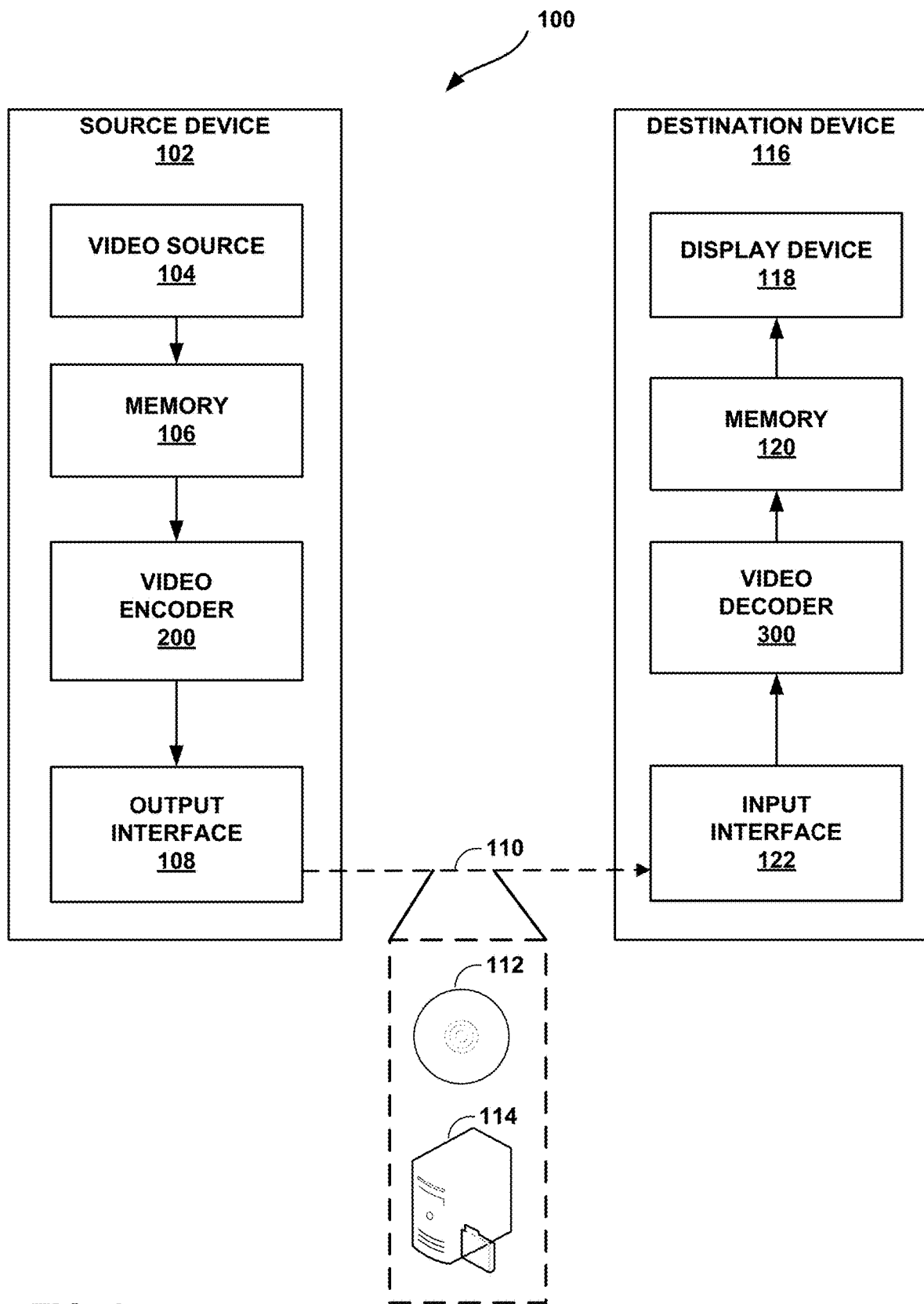
FIG. 1 is a block diagram illustrating an example video encoding and decoding system that may perform one or more of the various techniques disclosed herein.

This disclosure describes techniques related to the performance of various filtering techniques that may be employed during a video coding process. In particular, a video coder (e.g., video encoder and/or video decoder) may apply one or more different types of adaptive loop filters, including one or more nonlinear operators, to a set of samples during the video coding process. In an example, an adaptive loop filter (ALF) may be implemented during the performance of adaptive loop filtering, such as through implementation of one or more ALF designs. The adaptive loop filtering techniques disclosed may be implemented into existing video codecs, such as extensions of HEVC (High Efficiency Video Coding), or may be an efficient coding tool for a future video coding standard, such as the H.266 standard presently under development. As such, the various adaptive loop filtering techniques may be used in various video coding processes, including post-processing stages, as part of in-loop coding, or in the prediction stage of the video coding process.

As used herein, the term 'video coding' generically refers to either video encoding or video decoding. Similarly, the term 'video coder' may generically refer to a video encoder or a video decoder. Moreover, certain techniques described herein with respect to video decoding may also apply to video encoding, and vice versa. For example, often times video encoders and video decoders are configured to perform the same process, or reciprocal processes. Also, a video encoder typically performs video decoding as part of the processes of determining how to encode video data.

Video coding typically involves predicting a block of video data from either an already coded block of video data in the same picture (e.g., intra-prediction) or an already coded block of video data in a different picture (e.g., inter-prediction). In some instances, the video encoder also calculates residual data by comparing the predictive block to the original block. Thus, the residual data represents a difference between the predictive block and the original block. The video encoder transforms and quantizes the residual data and signals the transformed and quantized residual data in the encoded bitstream. A video decoder adds the residual data to the predictive block to produce a reconstructed video block that matches the original video block more closely than the predictive block alone. In some instances, a video coder may perform one or more filtering operations on the reconstructed video blocks in an effort to improve the quality of decoded video. In such examples, however, a video coder may have incurred various quantization errors during the video coding process, and thus, the quality of the decoded video and the efficiency of the video coding process may suffer as a result.

The aforementioned problems, among others, may be addressed by the disclosed techniques for utilizing nonlinear operators in various loop filtering processes, such as those that may be implemented during in-loop coding or other processing stages. In particular, the disclosure describes techniques related to adaptive loop filtering processes that utilize one or more nonlinear operators in the filtering process. An example adaptive loop filtering process includes an ALF design configured to implement one or more nonlinear operations and one or more filtering operations during a filtering process of the video coding process.

In an illustrative example, a video coder (e.g., video encoder and/or video decoder) may apply the ALF design, where the ALF design including one or more nonlinear operations as part of an adaptive loop filtering process. The video coder may apply the adaptive loop filtering process, to a set of samples following a quantization process. As such, the video coder may apply one or more nonlinear operators to the samples as part of the filtering process. In an illustrative example, an ALF design may define a filtering operation that follows a nonlinear operation. In another example, the ALF design may define a filtering operation that precedes a nonlinear operation. In such examples, the ALF design may define a pre-filtering operation that precedes a nonlinear operation and a post-filtering operation that follows the nonlinear operation.

In some examples, the video coder may code syntax elements that define various operational components of the adaptive loop filtering process. In some examples, a video coder may signal to a video decoder information regarding nonlinear operators used during the filtering process. In another example, the video coder may forego signaling such information, such as when the filter operations are pre-defined, such as a non-adaptively trained filtering operation.

In some examples, the video coder may implement the nonlinear operations as part of the adaptive loop filtering process. In some instances, the video coder may implement the nonlinear operation as a replacement for particular ALF designs that a video coder may, in certain examples, implement during a filtering process. In any event, a video coder may utilize such nonlinear adaptive loop filtering techniques in a post-processing stage, for in-loop coding, or in a prediction process. The video coder may utilize combinations of filters and nonlinear operators to compensate for certain nonlinear quantization errors incurred during a preceding video coding operation, and in turn, may improve resulting picture reconstruction, video quality, and the video coding process in general.

FIG. 1 is a block diagram illustrating an example video encoding and decoding system 100 that may perform one or more of the various techniques disclosed herein. The various techniques disclosed herein are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook computers (e.g., laptop computers), tablet computers, set-top boxes, telephone handsets such as smartphones, televisions, cameras, display devices, digital media players, video gaming consoles, video streaming devices, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for adaptive loop filtering. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than including an integrated display device.

System 100 as shown in FIG. 1 is merely one example. In general, any digital video encoding and/or decoding device may perform techniques for adaptive loop filtering. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, devices 102, 116 may operate in a substantially symmetrical manner such that each of devices 102, 116 include video encoding and decoding components. Hence, system 100 may support one-way or two-way video transmission between video devices 102, 116, e.g., for video streaming, video playback, video broadcasting, or video telephony.

In general, video source 104 represents a source of video data (e.g., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, computer-readable medium 110 may include storage device 112. Source device 102 may output encoded data from output interface 108 to computer-readable medium 110 (e.g., storage device 112). Similarly, destination device 116 may access encoded data from computer-readable medium 110 (e.g., storage device 112) via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, computer-readable medium 110 may include file server 114 or another intermediate storage device that may store the encoded video data generated by source device 102. Source device 102 may output encoded video data to file server 114 or another intermediate storage device that may store the encoded video generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a File Transfer Protocol (FTP) server, a content delivery network device, or a network attached storage (NAS) device. Destination device 116 may access encoded video data from file server 114 through any standard data connection, including an Internet connection. This may include a wireless channel (e.g., a Wi-Fi™ connection), a wired connection (e.g., digital subscriber line (DSL), cable modem, etc.), or a combination of both that is suitable for accessing encoded video data stored on file server 114. File server 114 and input interface 122 may be configured to operate according to a streaming transmission protocol, a download transmission protocol, or a combination thereof.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth® standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a cathode ray tube (CRT), a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as HEVC or extensions thereto, such as the multi-view and/or scalable video coding extensions. Alternatively, video encoder 200 and video decoder 300 may operate according to other proprietary or industry standards, such as the Joint Exploration Test Model (JEM) or ITU-T H.266, also referred to as Versatile Video Coding (VVC). A recent draft of the VVC standard is described in Bross, et al. "Versatile Video Coding (Draft 5)," Joint Video Experts Team (WET) of ITU-T SG 16 WP 3 and ISO/IEC JTC 1/SC 29/WG 11, 14$^{th}$ Meeting: Geneva, CH, 19-27 Mar. 2019, WET-N1001-v8 (hereinafter "VVC Draft 5"). The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to JEM or VVC. According to JEM or VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure.

The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) partitions. A triple tree partition is a partition where a block is split into three sub-blocks. In some examples, a triple tree partition divides a block into three sub-blocks without dividing the original block through the center. The partitioning types in MTT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile.

The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of JEM and VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of JEM and VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth (BD) associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

In accordance with one or more of the various techniques disclosed herein, a video coder (e.g., video encoder 200 and/or video decoder 300) may be configured to perform adaptive loop filtering using various syntax elements and/or ALF designs. As one example, the video coder may code a syntax element indicating one of a plurality of adaptive loop filtering processes for video data, wherein the plurality of adaptive loop filtering processes include (a) a single filtering operation, (b) a nonlinear operation followed by a filtering operation, and (c) a pre-filtering operation, followed by a nonlinear operation, followed by a post-filtering operation, and apply the indicated adaptive loop filtering processes to the video data based on the syntax element.

In an example, the video coder may be configured to perform adaptive loop filtering using one or more nonlinear operations. As an example, the video coder may code a syntax element that indicates a manner in which to apply a nonlinear operation to video data during an adaptive loop filtering process. The video coder may additionally apply the adaptive loop filter that includes the one or more nonlinear operations to the video data based on the syntax element to produce a filtered block of the video data. In some instances, the video coder may store the filtered block to memory.

In another example, the video coder may be configured to decode a syntax element that indicates a manner in which to perform an adaptive loop filtering process, the syntax element indicating that a nonlinear operation is to be applied to the video data. In addition, video coder is configured to apply nonlinear operation (e.g., one or more of nonlinear operator(s) 313) in combination with a filtering operation of an adaptive loop filtering process. The video coder may further perform the adaptive loop filtering process based on the syntax element.

Various examples of adaptive loop filtering are described elsewhere in the disclosure. In one example, the adaptive loop filtering process may include one or more nonlinear operations. In some examples, the nonlinear operation may be implemented as part of an ALF design.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or in some instances, not in real time, such as what might occur when storing syntax elements to storage device 112 for later retrieval by destination device 116.

Figure 2A:
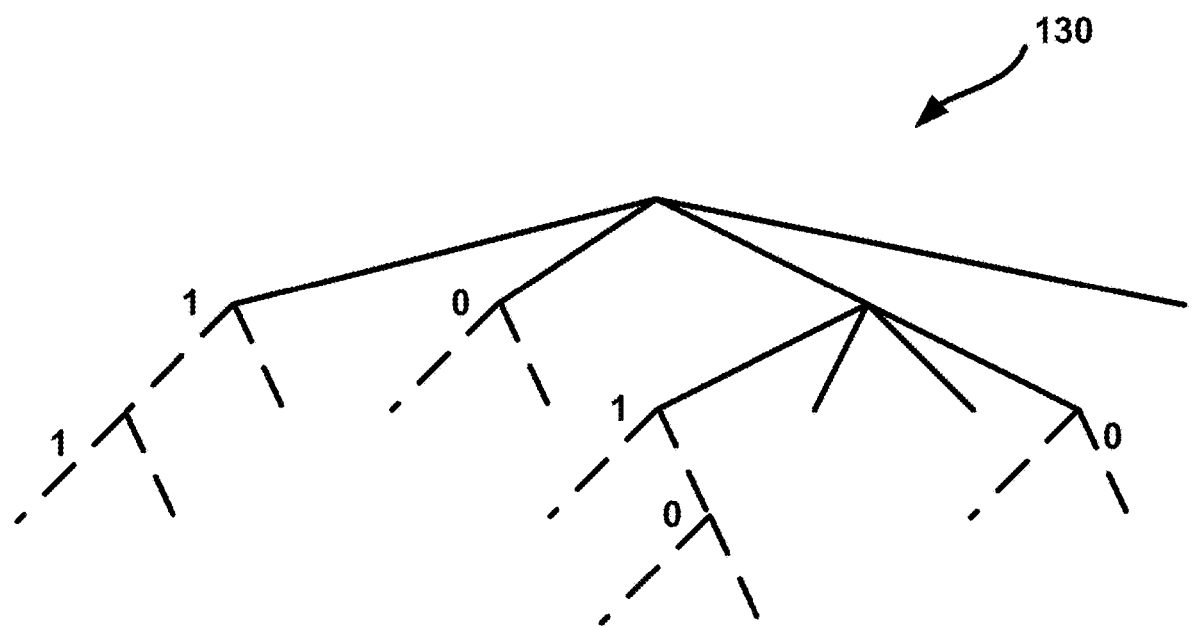
FIGS. 2A and 2B are conceptual diagrams illustrating an example quadtree binary tree (QTBT) structure, and a corresponding coding tree unit (CTU).
Figure 2B:
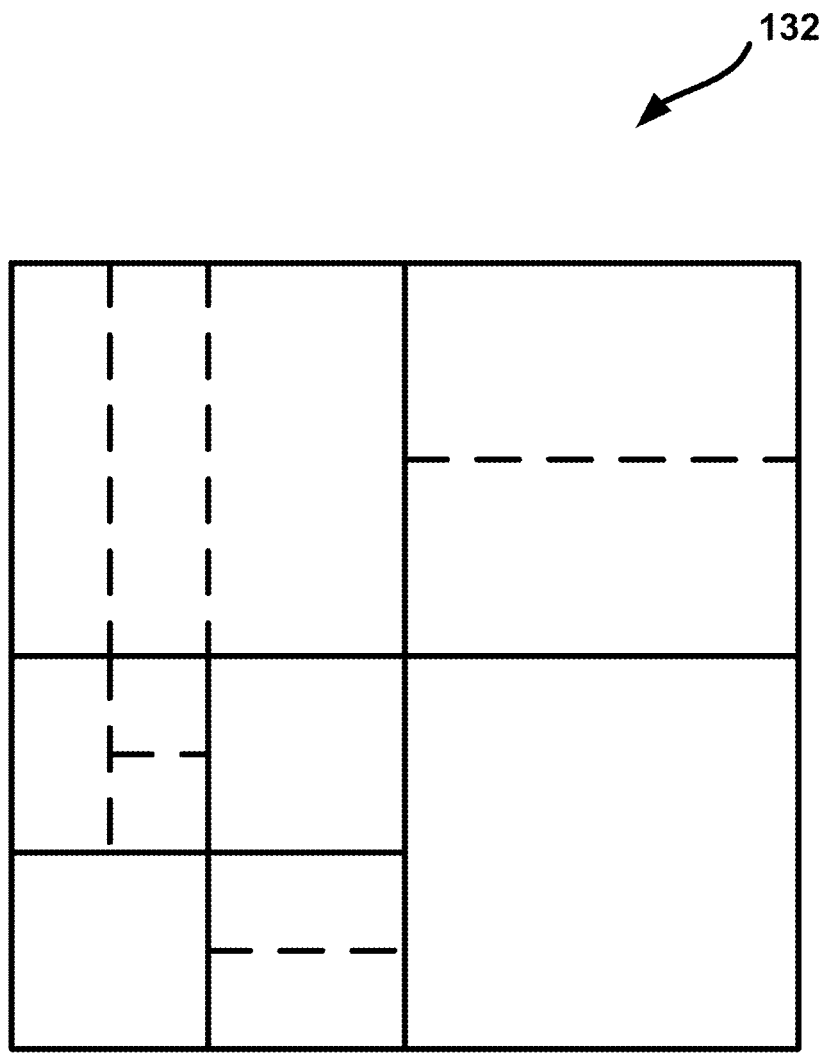

FIGS. 2A and 2B are conceptual diagram illustrating an example QTBT structure 130, and a corresponding CTU 132. The solid lines represent quadtree splitting, and dotted lines indicate binary tree splitting. In each split (e.g., nonleaf) node of the binary tree, one flag is signaled to indicate which splitting type is used (e.g., horizontal, vertical, etc.). In an illustrative and non-limiting example, a value of 0 may indicate horizontal splitting and a value of 1 may indicate vertical splitting. In another example involving quadtree splitting, there may be no need to indicate the splitting type because quadtree nodes, in general, split a block horizontally and vertically into 4 sub-blocks (e.g., prediction blocks). In such examples, the sub-blocks may or may not be of equal size. Accordingly, video encoder 200 may encode, and video decoder 300 may decode, syntax elements (such as splitting information) for a region tree level (e.g., the first level) of QTBT structure 130 (e.g., the solid lines) and syntax elements (such as splitting information) for a prediction tree level (e.g., the second level) of QTBT structure 130 (e.g., the dashed lines). Video encoder 200 may encode, and video decoder 300 may decode, video data, such as prediction and transform data, for CUs represented by terminal leaf nodes of QTBT structure 130.

In general, CTU 132 of FIG. 2B may be associated with parameters defining sizes of blocks corresponding to nodes of QTBT structure 130 at the first and second levels. These parameters may include a CTU size (representing a size of CTU 132 in samples), a minimum quadtree size (MinQTSize, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. If nodes of the first level are not larger than the maximum allowed binary tree root node size (MaxBTSize), then the nodes can be further partitioned by respective binary trees. The binary tree splitting of one node can be iterated until the nodes resulting from the split reach the minimum allowed binary tree leaf node size (MinBTSize) or the maximum allowed binary tree depth (MaxBTDepth). The example of QTBT structure 130 represents such nodes as having dashed lines for branches. The binary tree leaf node is referred to as a coding unit (CU), which is used for prediction (e.g., intra-picture or inter-picture prediction) and transform, without any further partitioning. As discussed herein, CUs may also be referred to generally as "video blocks," "coding blocks," or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (e.g., the MinQTSize) to 128×128 (e.g., the CTU size). If the quadtree leaf node is 128×128, the node will not be further split by the binary tree, since the size exceeds the MaxBTSize (e.g., 64×64, in this example). Otherwise, the quadtree leaf node will be further partitioned by the binary tree. Therefore, the quadtree leaf node is also the root node for the binary tree and has the binary tree depth as 0. When the binary tree depth reaches MaxBTDepth (4, in this example), no further splitting is permitted. When the binary tree node has width equal to MinBTSize (4, in this example), it implies that no further vertical splitting is permitted. Similarly, a binary tree node having a height equal to MinBTSize implies that no further horizontal splitting is permitted for that binary tree node. As noted above, leaf nodes of the binary tree are referred to as CUs, and are further processed according to prediction and transform without further partitioning.

Figure 3:
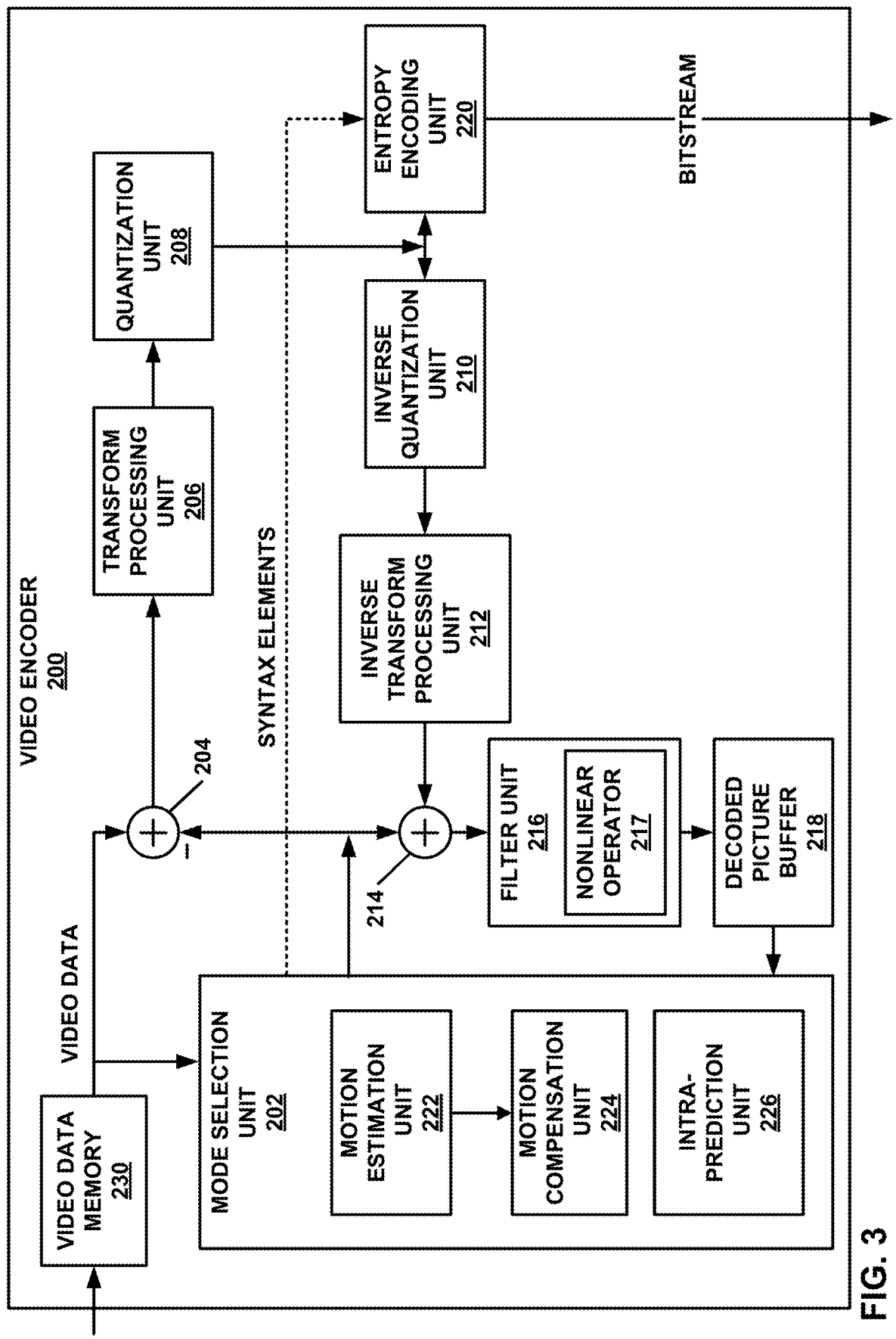
FIG. 3 is a block diagram illustrating an example video encoder that may perform one or more of the various techniques disclosed herein.

FIG. 3 is a block diagram illustrating an example video encoder 200 that may perform one or more of the various techniques disclosed herein. FIG. 3 is provided for purposes of explanation and should not be considered limiting of the techniques as broadly exemplified and described in this disclosure. For purposes of explanation, this disclosure describes video encoder 200 in the context of video coding standards such as the HEVC video coding standard and the H.266 video coding standard in development. However, the techniques of this disclosure are not limited to these video coding standards, and are applicable generally to video encoding and decoding.

In the example of FIG. 3, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 3 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, the one or more units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the object code of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block," "coding block," or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that define the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, such as through sample-by-sample averaging or weighted averaging.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As described herein, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra-prediction, and symmetric PU sizes of 2N×2N, 2N×N, N×2N, N×N, or similar for inter-prediction. Video encoder 200 and video decoder 300 may also support asymmetric partitioning for PU sizes of 2N×nU, 2N×nD, nL×2N, and nR×2N for inter prediction.

In examples where mode selection unit does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as a few examples, mode selection unit 202, via respective units associated with the coding techniques, may generate a prediction block for the current block being encoded. In some examples, such as palette mode coding, mode selection unit 202 may not generate a prediction block, and instead may generate syntax elements that indicate the manner in which to reconstruct the block based on a selected palette. In such modes, mode selection unit 202 may provide these syntax elements to entropy encoding unit 220 to be encoded.

As described herein, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may apply multiple transforms to a residual block, e.g., a primary transform and a secondary transform, such as a rotational transform. In some examples, transform processing unit 206 does not apply any transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion that various techniques of this disclosure are configured to reduce or virtually eliminate in some instances) based on the reconstructed residual block and a prediction block generated by mode selection unit 202. For example, reconstruction unit 214 may produce the reconstructed block by adding samples of the reconstructed residual block to corresponding samples from the prediction block generated by mode selection unit 202.

Filter unit 216 may perform one or more filter operations on reconstructed blocks. For example, filter unit 216 may perform deblocking operations to reduce blockiness artifacts along edges of CUs. Filter unit 216 may, in some examples, apply one or more adaptive loop filtering processes. The adaptive loop filtering process may include the application of at least one nonlinear operator 217 during the adaptive loop filtering process. In an example, filter unit 216 may implement an ALF design that defines nonlinear operator(s) 217. In an example, nonlinear operator(s) 217 may include clipping operators or non-clipping operators, such as shrinkage operators, sigmoid functions, or ReLU functions.

In addition, nonlinear operator(s) 217 may in some instances include parameters that define values for classifying nonlinear operator(s) 217, define the operating conditions of nonlinear operator(s) 217, or define an order for cascading nonlinear operator(s) 217 with other nonlinear operator(s) 217 and/or with one or more filtering operations. Thus, the adaptive loop filtering process may include nonlinear operations and/or filtering operations. Filter unit 216 may output filtered reconstructed blocks upon applying the one or more ALF processes in accordance with one or more of the various techniques disclosed herein. In some instances, operations of filter unit 216 may be skipped. As described herein, filter unit 216 may, in some instances, encode syntax elements that define nonlinear operator(s) 217 used during a filtering process.

Video encoder 200 stores reconstructed blocks in DPB 218. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded. In some examples, entropy encoding unit 220 may entropy encode syntax elements received from filter unit 216, such as syntax elements defining components of an adaptive loop filter used during video encoding and in some instances, a parameters of such components. In general, a parameters define the operational constraints and/or coefficients of a given nonlinear operation and are specifically defined for a given nonlinear operator as depending on the type of operator being applied. In an example, a nonlinear operator may include a shrink operator, in which case the a parameters define shrink values selected for the particular shrink operator so as to set the conditions for the operation of the shrink operator.

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying an MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Video encoder 200 represents an example of a device configured to encode video data including a memory configured to store video data, and one or more processing units implemented in circuitry and configured to code a syntax element indicating one of a plurality of adaptive loop filtering processes for video data, wherein the plurality of adaptive loop filtering processes include (a) a single filtering operation, (b) a nonlinear operation followed by a filtering operation, and (c) a pre-filtering operation, followed by a nonlinear operation, followed by a post-filtering operation, and apply the indicated adaptive loop filtering processes to the video data based on the syntax element.

In some examples, video encoder 200 may represent an example of a device configured to encode video data including a memory configured to store video data, and one or more processing units implemented in circuitry and configured to code a syntax element that indicates a manner in which to apply an adaptive loop filter to video data during an adaptive loop filtering process. The video encoder 200 may additionally apply the adaptive loop filter to the video data. In some instances, the video encoder 200 may store the filtered block to memory.

In another example, video encoder 200 may represent an example of a device configured to encode video data including a memory configured to store video data, and one or more processing units implemented in circuitry and configured to determine a nonlinear operation and a filtering operation to perform in an adaptive loop filtering process. Video encoder 200 may then perform the adaptive loop filtering process by applying the filtering operation and the nonlinear operation to the video data. In addition, video encoder 200 may encode a syntax element that indicates a manner in which the adaptive loop filtering process was performed.

Figure 4:
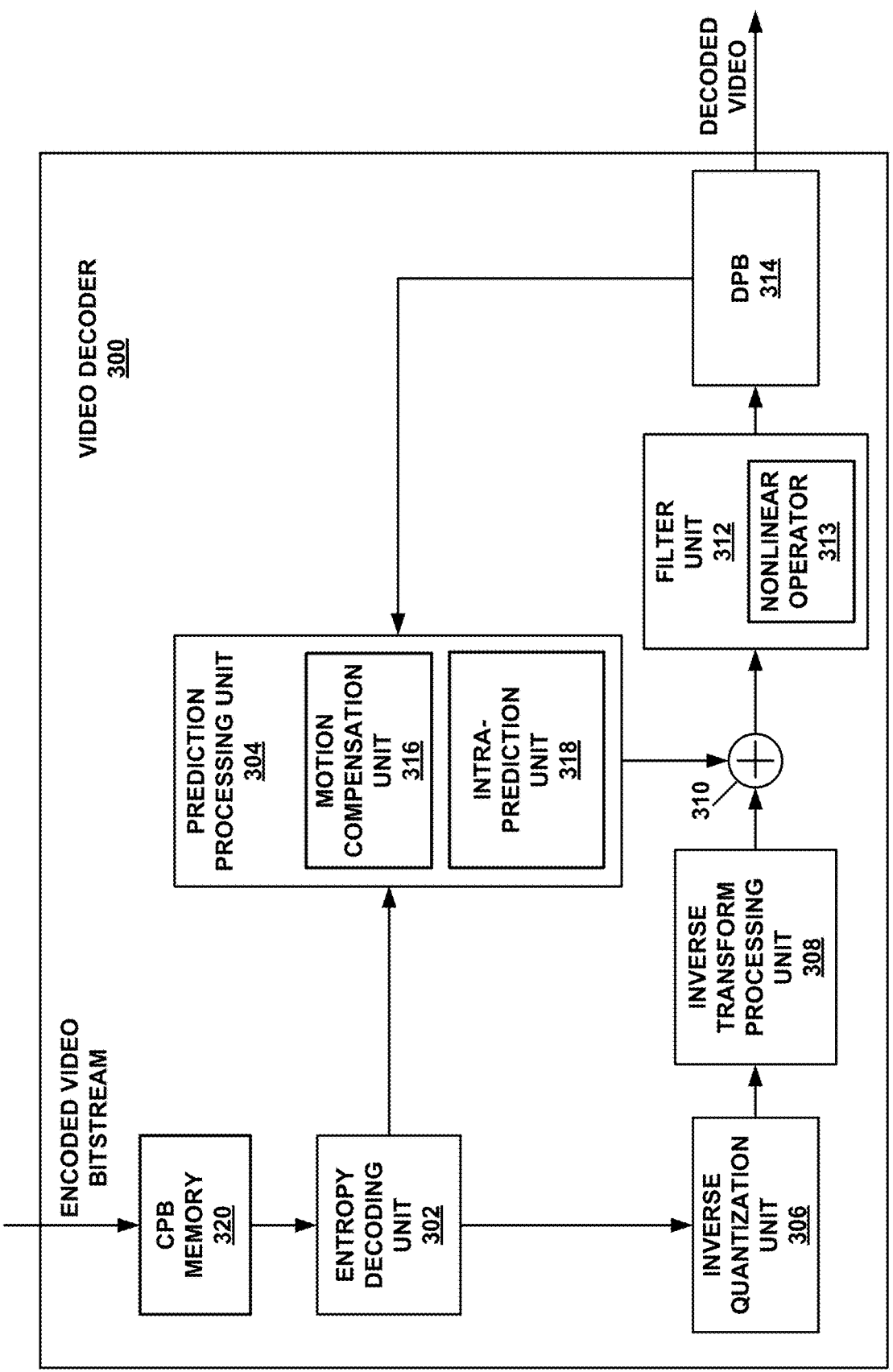
FIG. 4 is a block diagram illustrating an example video decoder that may perform one or more of the various techniques disclosed herein.

FIG. 4 is a block diagram illustrating an example video decoder 300 that may perform one or more of the various techniques disclosed herein. FIG. 4 is provided for purposes of explanation and is not limiting on the techniques as broadly exemplified and described in the disclosure. For purposes of explanation, this disclosure describes video decoder 300 according to the techniques of JEM, VVC, and HEVC. However, the techniques of this disclosure may be performed by video coding devices that are configured to other video coding standards.

In the example of FIG. 4, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 4 are illustrated to assist with understanding the operations performed by video decoder 300. The units may be implemented as fixed-function circuits, programmable circuits, or a combination thereof. Similar to FIG. 3, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, the one or more units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually. It should be noted that a block being currently reconstructed (e.g., decoded) may be referred to at times herein as a "current block".

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 3).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 3). Intra-prediction unit 318 may retrieve, from DPB 314, sample data for samples that are neighboring the current block.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Filter unit 312 may, in some examples, apply one or more adaptive loop filtering processes. The adaptive loop filtering process may include the application of at least one nonlinear operator 313. In an example, filter unit 312 may implement an ALF design that defines one or more adaptive loop filtering processes. An adaptive loop filtering process may include nonlinear operations and/or filtering operations. Filter unit 312 may output filtered reconstructed blocks upon applying the one or more ALF processes in accordance with one or more of the various techniques disclosed herein.

In some examples, filter unit 312 may implement an ALF design that defines nonlinear operator(s) 313. In an example, nonlinear operator(s) 313 may include clipping operators or non-clipping operators, such as shrinkage operators, sigmoid functions, or ReLU functions. In addition, nonlinear operator(s) 313 may in some instances include parameters that define values that classify nonlinear operator(s) 313, define the operating conditions of the nonlinear operator(s) 313, or define an order for cascading nonlinear operator(s) 313 with other nonlinear operator(s) 313 and/or with a filtering operation. As described herein, filter unit 312 may, in some instances, decode syntax elements that define nonlinear operator(s) 313 used during a filtering process. In addition, filter unit 312 may be configured to derive or infer information regarding application of nonlinear operator(s) 313 to video data, as described herein.

Video decoder 300 may store the reconstructed blocks in DPB 314. In some examples, filter unit 312 may store the filtered reconstructed blocks to DPB 314. As discussed herein, DPB 314 may provide reference information to prediction processing unit 304. In an example, DPB 314 may provide reference information, such as samples of a current picture for intra-prediction and previously decoded pictures for subsequent motion compensation. Moreover, video decoder 300 may output decoded pictures from DPB 314 for subsequent presentation on a display device, such as display device 118 of FIG. 1. It should be noted that operations of filter unit 312 are not necessarily performed in all instances. As such, where video decoder 300 does not perform operations of filter unit 312, reconstruction unit 310 may store reconstructed blocks to DPB 314.

In this manner, video decoder 300 represents an example of a video decoding device including a memory configured to store video data, and one or more processing units implemented in circuitry and configured to code a syntax element indicating one of a plurality of adaptive loop filtering processes for video data, wherein the plurality of adaptive loop filtering processes include (a) a single filtering operation, (b) a nonlinear operation followed by a filtering operation, and (c) a pre-filtering operation, followed by a nonlinear operation, followed by a post-filtering operation, and apply the indicated adaptive loop filtering processes to the video data based on the syntax element.

In an example, video decoder 300 represents an example of a video decoding device including a memory configured to store video data, and one or more processing units implemented in circuitry and configured to code a syntax element that indicates a manner in which to apply an adaptive loop filter to video data during an adaptive loop filtering process. Video decoder 300 may additionally apply the adaptive loop filter to the video data based on the syntax element. In some instances, video decoder 300 may store the filtered block to memory.

In another example, video decoder 300 represents an example of a video decoding device including a memory configured to store video data, and one or more processing units implemented in circuitry and configured to perform an adaptive loop filtering process. In such examples, video decoder 300 may be configured to decode a syntax element that indicates a manner in which to perform an adaptive loop filtering process, the syntax element indicating that a nonlinear operation is to be applied to the video data, where the nonlinear operation is configured to be applied in combination with a filtering operation of the adaptive loop filtering process. In addition, video decoder 300 may perform the adaptive loop filtering process based on the syntax element.

The next sections (starting from the section entitled "Adaptive Loop Filter (ALF) with clipping" and extending through the section entitled "Coding Tree Block (CTB)/CTU-based filter set switch") describe example adaptive filtering techniques. One or more of the various adaptive filtering techniques described next may be implemented, in some examples, as part of VVC Draft 5 and VVC Test Model (VTM) 5.0.

Adaptive Loop Filter (ALF) with Clipping

As in VTM-5.0, the decoded filter coefficients f(k, l) and clipping values c(k, l) may be applied to a reconstructed image R(i, j) as follows:

$$\tilde{R}(i,j)=R(i,j)+\Sigma_{k,l=(-K,-K),k,l\neq(0,0)}^{K,K}f(k,l)*\text{clip3}(-c(k,l), c(k,l),R(i+k,j+1))$$  eq. (1)

In some examples, video encoder 200 and video decoder 300 may be configured to apply a 7×7 filter to luma components and apply a 5×5 filter to chroma components.

Figure 5:
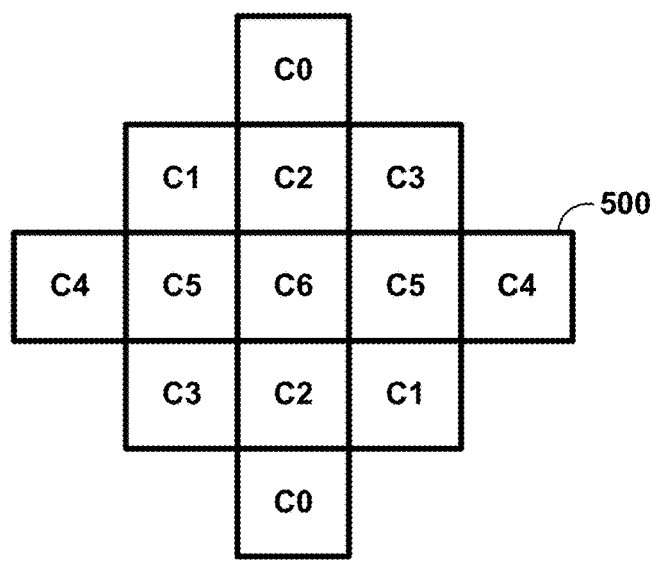
FIG. 5 is a conceptual diagram illustrating example adaptive loop filter (ALF) supports, in accordance with one or more of the various techniques disclosed herein.
Figure 5:
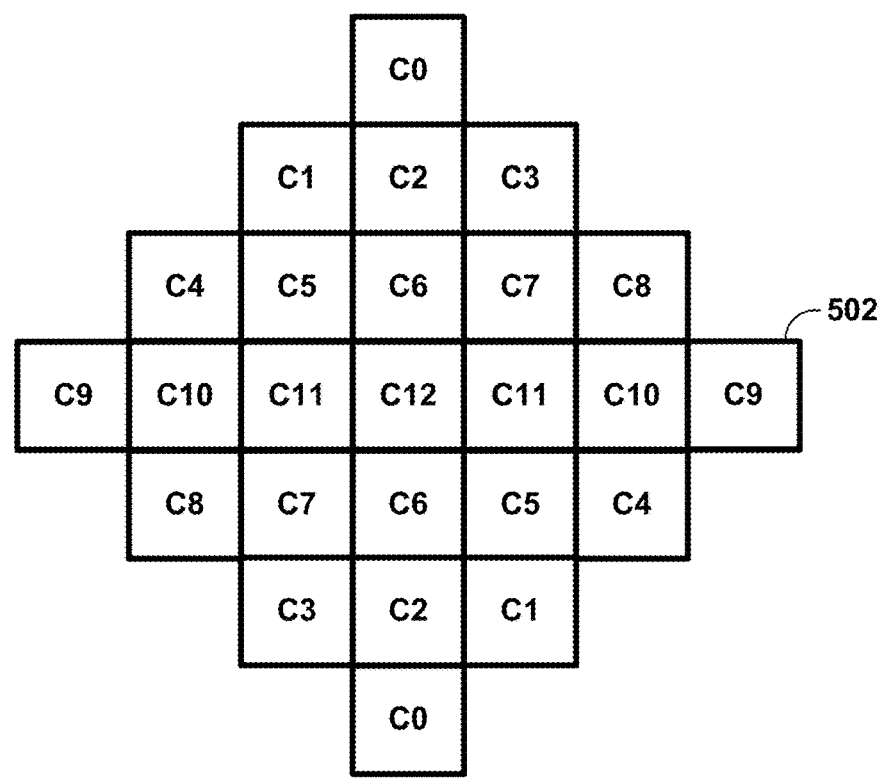

FIG. 5 is a conceptual diagram illustrating example adaptive loop filter (ALF) supports. As shown in FIG. 5, ALF filter support 500 is a 5×5 diamond-shaped filter support and ALF filter support 502 is a 7×7 diamond-shaped filter support.

Video encoder 200 and/or video decoder 300 may calculate the clipping value, c(k, l), for luma components and may calculate the clipping value, c(k, l), for chroma components as follows:

For a luma component:

$$c(k,l)=\text{Round}(2^{(BitDepthY*(4-clipIdx(k,l))/4)}),$$

where BitDepthY represents the BD for the luma component and clipIdx(k,l) represents the clipping values at position (k,l). The value of clipIdx(k,l) can be 0, 1, 2 or 3.

For a chroma component:

$$c(k,l) = \text{Round}(2^{(BitDepthC-8)} * 2^{(8*(3-clipIdx(k,l))/3)}), \quad \text{eq. (1)}$$

where BitDepthC represents the BD for the chroma component and clipIdx(k,l) is the clipping values at position (k,l). The value of clipIdx(k,l) can be 0, 1, 2 or 3.

Pixel Classification

For the luma component, video encoder 200 and video decoder 300 may be configured to classify 4×4 blocks in the whole picture based on one-dimensional Laplacian direction (e.g., up to 5 direction values) and two-dimensional Laplacian activity (e.g., up to 5 activity values). In some examples, video encoder 200 and video decoder 300 may be configured to further quantize the calculation of direction $Dir_b$. In addition, video encoder 200 and video decoder 300 may be configured to quantize the calculation of unquantized activity $Act_b$. In an example, video encoder 200 and/or video decoder 300 may quantize $Act_b$ to a range of 0 to 4, inclusively.

In some examples, video encoder 200 and video decoder 300 may be configured to calculate values of two diagonal gradients using a one-dimensional Laplacian. In addition, video encoder 200 and video decoder 300 may calculate horizontal and vertical gradients, such as for horizontal and vertical gradients used in some ALF designs. Similarly to diagonal gradients, video encoder 200 and video decoder 300 may calculate the horizontal and vertical gradients using one-dimensional Laplacian.

In some examples, video encoder 200 and video decoder 300 may be configured to determine a representative gradient of a target pixel based on gradients of other pixels within a particular window that covers the target pixel. With reference to equations (2) through (5) below, video encoder 200 and video decoder 300 may employ a summation value of pixel gradients within a particular window as a representative gradient of a target pixel. That is, video encoder 200 and video decoder 300 may determine a represented gradient of the target pixel. In an illustrative example, video encoder 200 and video decoder 300 may employ, as the represented gradient of the target pixel, a sum of gradients of all pixels within an 8×8 window, where the 8×8 window covers the target pixel. In equations (2) through (5) below, R (k, l) represents the reconstructed pixels at location (k, l) and indices i and j refer to the coordinates of the upper left pixel in a 4×4 block. As such, each pixel may be associated with four gradient values. In example equations (2) through (5) below, $g_v$ represents a vertical gradient, $g_h$ represents a horizontal gradient, $g_{d1}$ represents a 135-degree diagonal gradient, and $g_{d2}$ represents a 45-degree diagonal gradient.

$$g_v = \sum_{k=i-2}^{i+3} \sum_{l=j-2}^{j+3} V_{k,l}, \quad \text{eq. (2)}$$

$$V_{k,l} = |2R(k, l) - R(k, l-1) - R(k, l+1)|$$

$$g_h = \sum_{k=i-2}^{i+3} \sum_{l=j-2}^{j+3} H_{k,l}, \quad \text{eq. (3)}$$

$$H_{k,l} = |2R(k, l) - R(k-1, l) - R(k+1, l)|$$

$$g_{d1} = \sum_{k=i-2}^{i+3} \sum_{l=j-3}^{j+3} D1_{k,l}, \quad \text{eq. (4)}$$

$$D1_{k,l} = |2R(k, l) - R(k-1, l-1) - R(k+1, l+1)|$$

$$g_{d2} = \sum_{k=i-2}^{i+3} \sum_{j=j-2}^{j+3} D2_{k,l}, \quad \text{eq. (5)}$$

$$D2_{k,l} = |2R(k, l) - R(k-1, l+1) - R(k+1, l-1)|$$

To assign a direction value, $Dir_b$, video encoder 200 and video decoder 300 may be configured to determine a first ratio of the maximum and minimum of the horizontal and vertical gradients. In addition, video encoder 200 and video decoder 300 may determine a second ratio of the maximum and minimum of the two diagonal gradients. The ratio of the maximum and minimum of the horizontal and vertical gradients is denoted in equation(6) by $R_{h,v}$. Similarly, the ratio of the maximum and minimum of the two diagonal gradients is denoted by $R_{d0,d1}$ in equation (7).

$$R_{h,v} = g_{h,v}^{max} / g_{h,v}^{min} \quad \text{eq. (6)}$$

wherein $g_{h,v}^{max} = \max(g_h, g_v), g_{h,v}^{min} = \min(g_h, g_v)$, $$R_{d0,d1} = g_{d0,d1}^{max} / g_{d0,d1}^{min}$$

wherein $g_{d0,d1}^{max} = \max(g_{d0}, g_{d1}), g_{d0,d1}^{min} = \min(g_{d0}, g_{d1})$ \quad eq. (7)

Upon determining the first and second ratios, video encoder 200 and video decoder 300 may then compare the first ratio and the second ratio to determine a direction value, $Dir_b$. In some examples, video encoder 200 and video decoder 300 may compare the two ratios against each other, as denoted in equation (8) below, with the comparison being in reference to two thresholds $t_1$ and $t_2$. Based on a comparison of the detected ratios of horizontal/vertical gradients and the diagonal gradients, five direction values (e.g., $Dir_b$ within the range of [0, 4] inclusive) may then be defined as shown in equation (8) below.

$$Dir_b = \begin{cases} 0 & R_{h,v} \le t_1 \ \&\& R_{d0,d1} \le t_1 \\ 1 & R_{h,v} > t_1 \ \&\& R_{h,v} > R_{d0,d1} \ \&\& R_{h,v} > t_2 \\ 2 & R_{h,v} > t_1 \ \&\& R_{h,v} > R_{d0,d1} \ \&\& R_{h,v} \le t_2 \\ 3 & R_{d0,d1} > t_1 \ \&\& R_{h,v} \le R_{d0,d1} \ \&\& R_{d0,d1} > t_2 \\ 4 & R_{d0,d1} > t_1 \ \&\& R_{h,v} \le R_{d0,d1} \ \&\& R_{d0,d1} \le t_2 \end{cases} \quad \text{eq. (8)}$$

The values of $Dir_b$ and the physical meaning of $Dir_b$ are described in Table 1 below.

TABLE 1

Values of Direction ($Dir_b$) and Physical Meaning.

| Direction values ($Dir_b$) | Physical Meaning |
| --- | --- |
| 0 | Texture |
| 1 | Strong horizontal/vertical |
| 2 | horizontal/vertical |
| 3 | strong diagonal |
| 4 | diagonal |

In addition, video encoder 200 and video decoder 300 may be configured to calculate the activity value, $Act_b$, as follows:

$$Act_b = \sum_{k=i-3}^{i+4} \sum_{l=j-3}^{j+4} (V_{k,l} + H_{k,l}) \quad \text{eq. (9)}$$

Video encoder 200 and video decoder 300 may be configured to further quantize the value of $Act_b$ to the range of 0 to 4, inclusive. The quantized value of $Act_b$ is denoted as $\hat{A}$.

Quantization Process from Activity Value $Act_b$ to Activity Index $\hat{A}$

The quantization process may be defined as follows:
avg_var=Clip_post(NUM_ENTRY-1,
 ($Act_b$*ScaleFactor)>>shift);
$\hat{A}$=ActivityToIndex[avg_var]
where NUM_ENTRY may be set to 16, ScaleFactor may be set to 64, shift may be (4+internal coded-bitdepth), ActivityToIndex[NUM_ENTRY]={0, 1, 2, 2, 2, 2, 2, 3, 3, 3, 3, 3, 3, 3, 3, 4}, and function Clip_post(a, b) returns the smaller value between a and b.

In some examples, video encoder 200 and video decoder 300 may be configured to categorize each 4×4 luma block into one class out of 25 (5×5) classes. In addition, video encoder 200 and video decoder 300 may assign a group index to each 4×4 block according to the value of $Dir_b$ and $Act_b$ of the block. Video encoder 200 and video decoder 300 may be configured to denote, for each block, the group index as variable 'C.' In such examples, video encoder 200 and video decoder 300 may assign a group index based on the equation $5Dir_b+\hat{A}$. In an example, video encoder 200 may assign a group index to a block, where the group index equals $5Dir_b+\hat{A}$, where $\hat{A}$ represents the quantized value of $Act_b$ for the block.

Geometry Transformations

In some examples, for each class category, video encoder 200 may be configured to code and signal one set of filter coefficients and clipping values. In addition, video encoder 200 may utilize four geometry transformations (e.g., diagonal, vertical flip, rotation, and no transformation) to better distinguish different directions of blocks that may be marked with the same category index.

Figure 6:
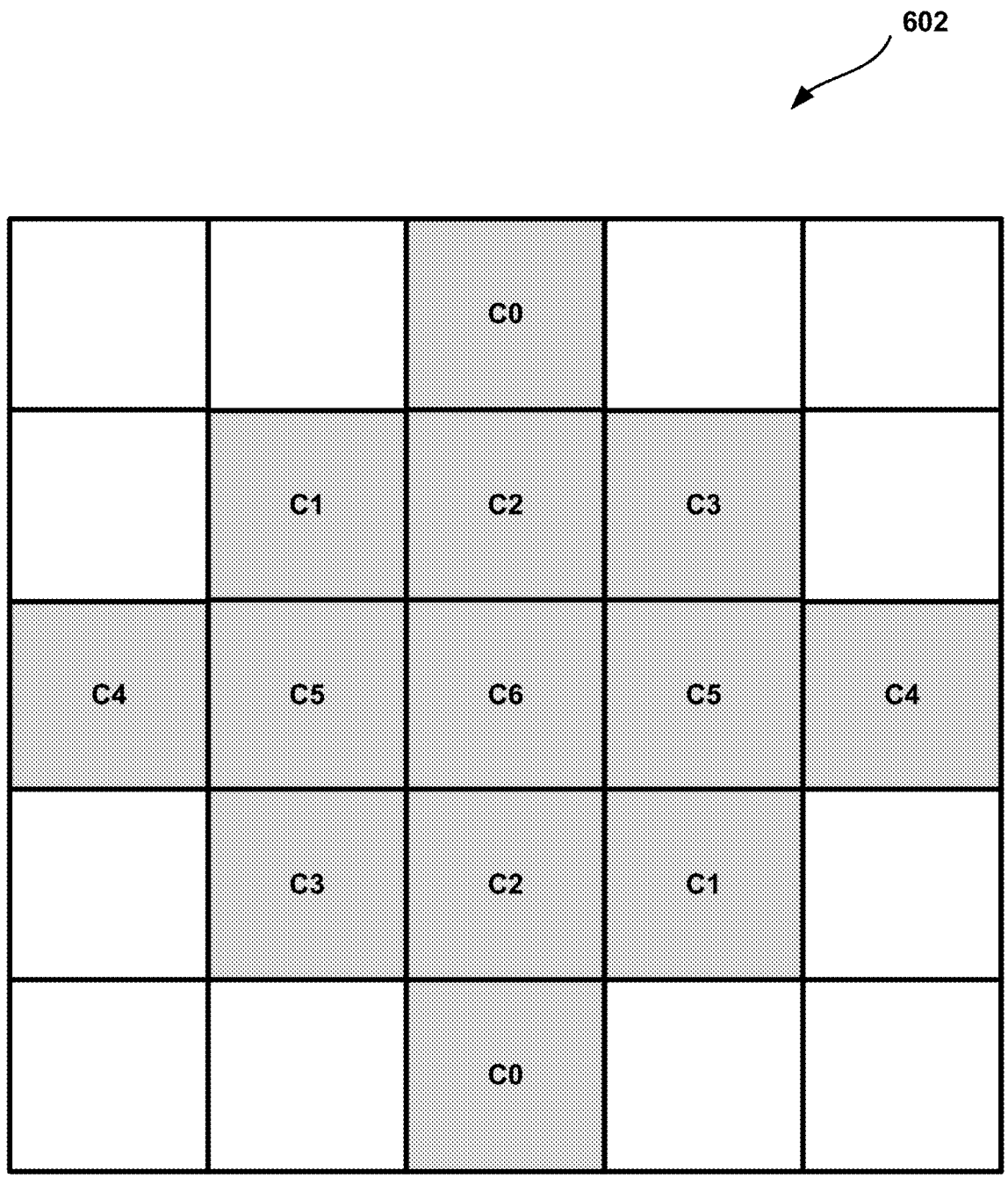
FIG. 6 is a conceptual diagram illustrating an example 5×5 diamond-shaped filter support, in accordance with one or more of the various techniques disclosed herein.
Figure 7:
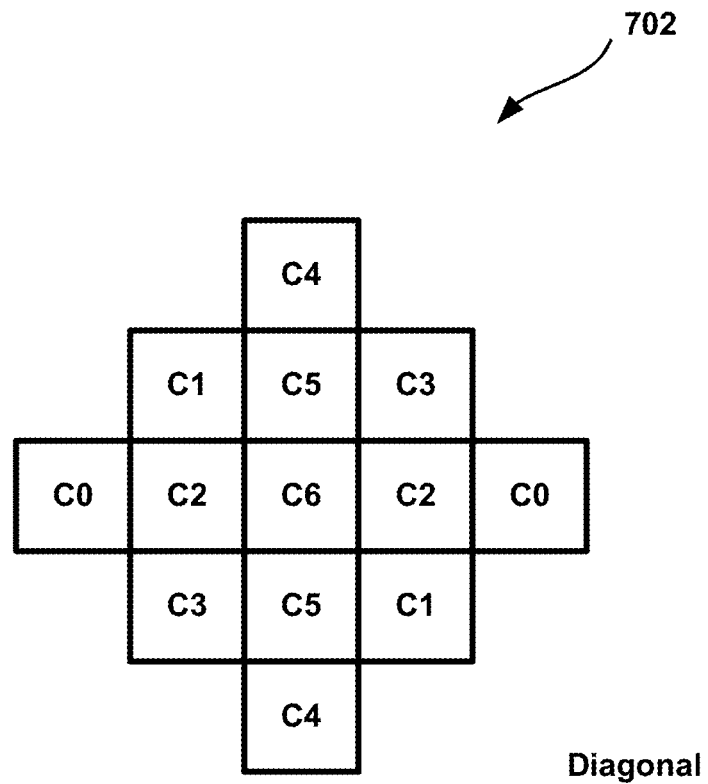
FIGS. 7-9 are conceptual diagrams illustrating example geometry transformations, in accordance with one or more of the various techniques disclosed herein.
Figure 8:
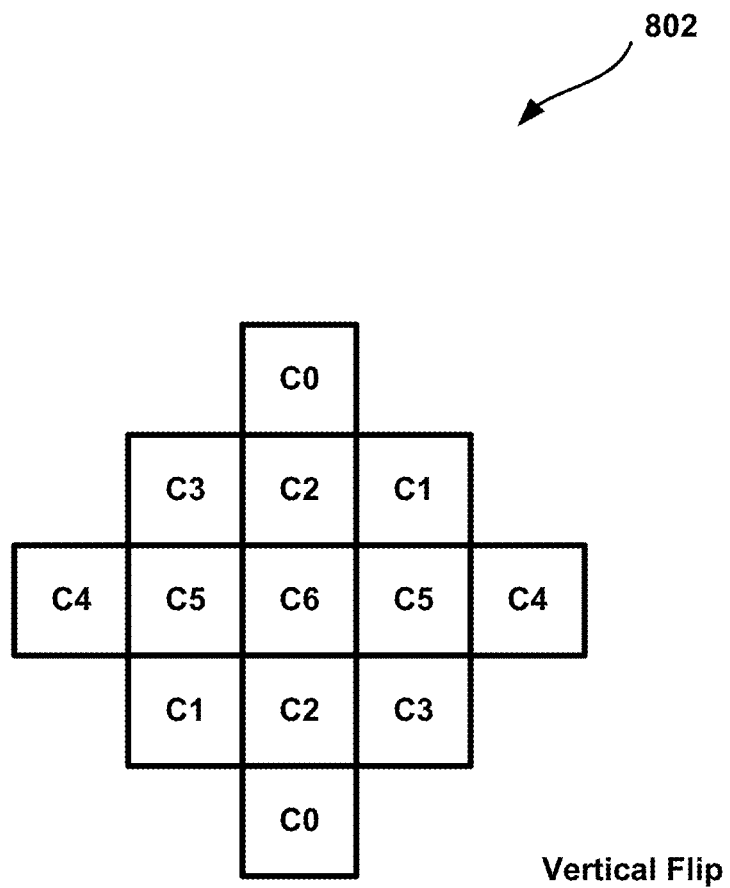
Figure 9:
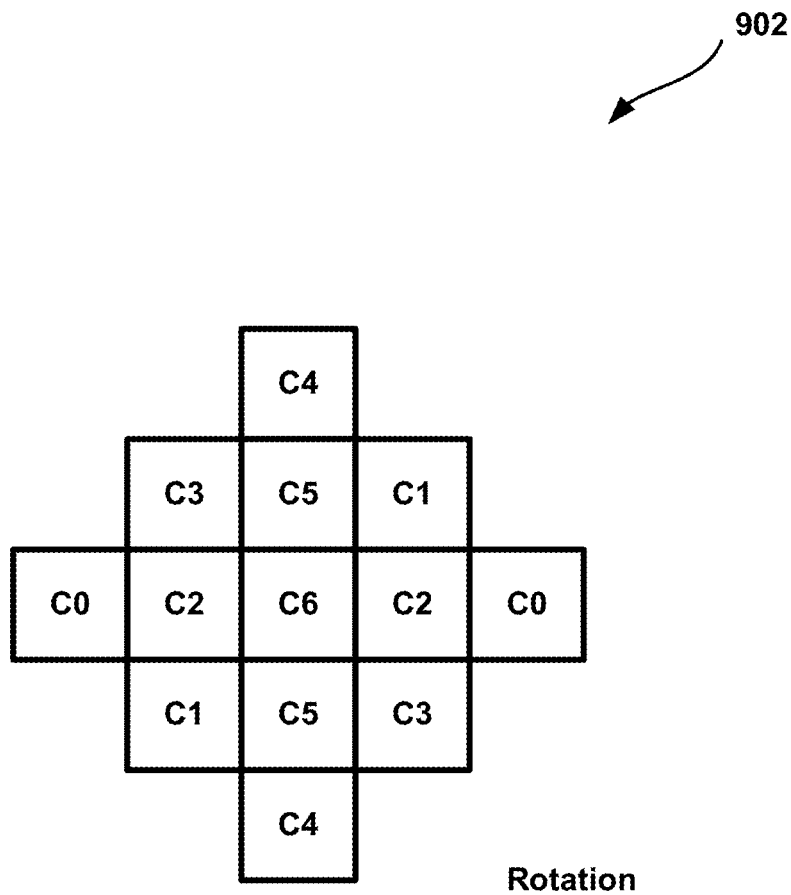

FIG. 6 is a conceptual diagram illustrating an example 5×5 diamond-shaped filter support 602. FIG. 7 is a conceptual transformation diagram 702 illustrating an example transformation of 5×5 filter support 602 based on a diagonal transformation. FIG. 8 is a conceptual diagram 802 illustrating an example transformation of 5×5 filter support 602 based on a vertical flip transformation. FIG. 9 is a conceptual diagram 902 illustrating an example transformation of 5×5 filter support 602 based on a rotation transformation. When comparing 5×5 filter support 602 of FIG. 6 with the transformed filter supports of diagram 702 of FIG. 7, diagram 802 of FIG. 8, and diagram 902 of FIG. 9, the formula forms of three geometry transformations may be represented as follows:

$$f_D(k,l)=f(l,k), c_D(k,l)=(l,k); \quad \text{Diagonal:}$$

$$f_V(k,l)=f(k,K-l-1), c_V(k,l)=c(k,K-l-1); \text{ and} \quad \text{Vertical flip:}$$

$$f_R(k,l)=f(K-l-1,k), c_R(k,l)=c(K-l-1,k), \quad \text{Rotation:}$$

where K is the size of the filter and $0 \leq k, l \leq K-1$ are coordinates of the filter coefficients. In addition, c(k, l) represents clipping values. In such examples, location (0,0) may refer to a coordinate at the upper left corner. In addition, location (K-1, K-1) may refer to a coordinate at the lower right corner. When a video coder (e.g., a video encoder 200 and/or video decoder 300) utilizes a diamond-shaped filter support, such as in particular ALF designs, the coefficients with a coordinate outside of the filter support may be set to 0. In some examples, a video coder may indicate and/or determine a geometry transformation index by deriving the geometry transformation implicitly (e.g., without signaling). In such examples, the video coder may derive the geometry transformation index while avoiding additional overhead.

In Geometric ALF (GALF), video encoder 200 and video decoder 300 may be configured to apply various geometry transformations to the filter coefficients f(k, l) depending on gradient values calculated for that block. An example relationship between the geometry transformation and the four gradients is shown in Table 2 below. Video encoder 200 and video decoder 300 may calculate the four gradients using equations (2) through (5) above. In some examples, video encoder 200 and video decoder 300 may apply a geometry transformation based on a determination as to which of two different gradients is larger. In an example, video encoder 200 and video decoder 300 may determine which of two gradients is larger when comparing horizontal gradient values and vertical gradient values and when comparing 45-degree gradient values and 135-degree gradient values. In an illustrative example, video encoder 200 may determine, for a block, that a horizontal gradient value ($g_h$) is larger than a vertical gradient value($g_v$) and that a 135-degree gradient value ($g_{d1}$) is larger than a 45-degree gradient value ($g_{d2}$). As such, video encoder 200 may determine, in accordance with the example transformation mapping outlined in Table 2 below, that video encoder 200 is to apply the diagonal transformation to the filter coefficients of the block. Based on such a comparison between gradient values, more accurate direction information can be effectively extracted from the coding information. Therefore, different filtering results may be obtained (e.g., due to a transformation) while effectively avoiding an increase in overhead of filter coefficients.

TABLE 2

Mapping of Gradient and Transformations.

| Gradient values | Transformation |
| --- | --- |
| $g_{d2} < g_{d1}$ and $g_h < g_v$ | No transformation |
| $g_{d2} < g_{d1}$ and $g_v < g_h$ | Diagonal |
| $g_{d1} < g_{d2}$ and $g_h < g_v$ | Vertical flip |
| $g_{d1} < g_{d2}$ and $g_v < g_h$ | Rotation |

Filter Information Signaling

One luma filter set includes filter information (including filter coefficients and clipping values) for all 25 classes (5×5). In one example, video encoder 200 and video decoder 300 may use one or more fixed filters to predict the filters for each class. In some examples, video encoder 200 may be configured to signal a flag for each class to indicate whether a class uses a fixed filter as the filter predictor for the class. If yes (e.g., fixed filter is used as a filter predictor), video encoder 200 and video decoder 300 may signal the fixed filter information.

To reduce the number of bits required to represent the filter coefficients, different classes can be merged. The information indicating which classes are merged may be provided by sending, for each of the 25 classes, an index $i_c$. Classes having the same index $i_c$ share the same filter coefficients that are coded. Video encoder 200 may be configured to signal the mapping between classes and filters for each luma filter set. Video encoder 200 and video decoder 300 may be configured to code the index $i_c$ with a truncated binary binarization method.

In some examples, video encoder 200 and video decoder 300 may be configured to code predict a signaled filter from a previously signaled filter.

Adaptive Parameter Set (APS)

In VTM-5.0, video encoder 200 and video decoder 300 may utilize adaptive parameter sets (APSs) configured to carry ALF filter coefficients in a bitstream. In an example, an APS may include a set of luma filter coefficients (e.g., ALF filter coefficients for luma components), a set of chroma filter coefficients (e.g., ALF filter coefficients for chroma components), or both sets of filter coefficients. In some examples, video encoder 200 and video decoder 300 may be configured to code indices of APSs used for the current tile group in the corresponding tile group header.

Coding Tree Block (CTB)/CTU-Based Filter Set Switch

In VTM-5.0, video encoder 200 and video decoder 300 may be configured to use filters generated from previously-coded tile groups for a current tile group to save the overhead for filter signaling. Video encoder 200 and video decoder 300 may be configured to choose, for a luma coding tree block (CTB)/CTU, a filter set among fixed filter sets and filter sets from APSs. In an example, video encoder 200 may be configured to signal the filter set index. In some examples, video encoder 200 and video decoder 300 may use filters from the same APS for chroma CTBs. In a tile group header, video encoder 200 may signal the APSs used for luma and chroma CTBs of a current tile group.

Filtering and/or Nonlinear Operation Extensions in ALF Designs

As discussed above with reference to adaptive loop filtering with clipping, in VTM 5.0, a codec (e.g., video encoder 200 and video decoder 300) may use a clipping operation applied before the adaptive loop filtering process. In this context, a clipping operation applied before an adaptive loop filtering process during a video coding process is generally referred to herein as a pre-clipping operation or pre-clip operator. This disclosure describes techniques that extend the clipping operation by using different types of nonlinear operators in various ways to reduce the level of quantization errors incurred during the video encoding and video decoding process.

In an example, a video coder (e.g., video encoder 200 and video decoder 300) may use a clip operator (also referred to herein as a "clipping operation" or "clipping") as a nonlinear operation. The video coder may apply the clip operator to a set of samples, or to one or more subsets of a sample. The video coder may then transfer the resulting samples to certain components of the video coder (e.g., filter unit 216 of FIG. 3, filter unit 312 of FIG. 4). The video coder may then execute an adaptive loop filtering process. In some examples, however, this video coding process or video decoding process may result in the proliferation of various quantization errors. A video coder may incur such quantization errors when certain components of the video coder perform quantization or inverse quantization processes (e.g., via inverse quantization unit 210 of FIG. 3, via inverse quantization unit 306 of FIG. 4, etc.). The quantization errors may include linear errors, nonlinear errors, or in some instances, both. When left uncompensated, quantization errors, whether linear or nonlinear, tend to affect the output quality of the video coding process and video decoding process. In addition, quantization errors may result in a low coding efficiency for the encoding process and/or the decoding process.

The aforementioned problems, among others, may be addressed by the disclosed techniques for utilizing nonlinear operations in various adaptive loop filter (ALF) designs. In an example, video encoder 200 and video decoder 300 may apply an adaptive loop filtering process to a set of input samples. The ALF process may include a nonlinear operation, a filtering operation, or in some examples, may include various combinations of both nonlinear operations and filtering operations. In such examples, video encoder 200 and video decoder 300 may execute the adaptive loop filtering process by applying one or more ALF designs to various sets of input samples, or in some instances, to subsets of one or more input samples, where the ALF designs include the application of one or more nonlinear operators to the samples.

In some examples, video encoder 200 and video decoder 300 may utilize an ALF design that defines a nonlinear operation. In some examples, a nonlinear operation may include applying one or more nonlinear operators to samples that serve as input to an ALF of filter unit 216 of FIG. 3 or of filter unit 312 of FIG. 4. Example nonlinear operators include clipping operators or non-clipping operations, such as shrinkage operators, sigmoid functions, ReLU (rectified linear unit) functions, or variations of such nonlinear operations or other nonlinear operations. In some examples, a neural network (NN) may utilize one or more of the nonlinear operators, such as one or more of the non-clipping nonlinear operators. In an example, an NN may use a ReLU operator, a sigmoid operator, or a cascaded version of a ReLU and sigmoid operator.

In some examples, an NN operator that utilizes such clipping or non-clipping operations may precede the ALF process or may take the place of the ALF process. In addition, the example NN operator may replace a clipping operation that precedes the ALF process. In an illustrative example, a video coder may apply, to a set of input samples, a nonlinear operation followed by a filtering operation. The nonlinear operation may include a NN that utilizes one or more nonlinear operators, such as a ReLU and/or sigmoid operator, as part of the nonlinear operation. In addition to the nonlinear operation, the video coder may then apply a follow-on filtering operation. In some examples, the filtering operation may include a bilateral filter or other type of filter. In such examples, the video coder may apply the NN operators, to replace the both ALF process and any pre-clipping operations that may have preceded the ALF process.

A video coder (e.g., video encoder 200 and video decoder 300) may implement such adaptive loop filters (e.g., filters that include nonlinear operators, such as a NN-based nonlinear operator) to compensate for errors incurred during various quantization processes. In some examples, such adaptive loop filters have been seen to provide gains in BD-rate, improve distortion levels that may manifest in a resulting picture quality, improve coding efficiency, and in general, improve the video coding process. In particular examples, such adaptive loop filters have been shown to provide similar advantageous when implemented as part of the ALF process, as an extension of the ALF process, or in lieu of the ALF process altogether. In some example, video encoder 200 and video decoder 300 may apply a nonlinear operation that precedes the ALF process, where the nonlinear operation includes a cascade of nonlinear operators, such as a cascade of clip operators, shrink operators, combinations of different types of nonlinear operators, etc. In such examples, the nonlinear operation may then be followed by a filtering operation, such as a filtering operation that defines a bilateral filter application. In another example, such adaptive loop filters may displace or otherwise dispose of any nonlinear operation that may precede the ALF process, such as by not performing a clipping operation that may precede the ALF process.

In such examples, video encoder 200 and video decoder 300 may effectively compensate for quantization errors through implementation of such ALF processes defined by an ALF design. That is, video encoder 200 and video decoder 300 may apply a nonlinear ALF process to compensate for nonlinear quantization errors that manifest during the coding or decoding processes of certain samples prior to the ALF process. In another example, application of an ALF design that defines a nonlinear operator may advantageously result in gains in BD-rate and in addition, may improve distortion levels and improve overall video coding and video decoding efficiency.

In some examples, a nonlinear operation of an ALF design may include a clip operator, a cascade of clip operators, other nonlinear operators, or a cascade of nonlinear operators that effectively chain together nonlinear operators, regardless of whether or not the cascading operation includes the same or different types of nonlinear operators. In an example, the ALF design may define nonlinear operators that, in some instances, are different from a nonlinear clip operator. In some examples, a nonlinear operation may define one or more nonlinear operators that include a shrinkage operator, a sigmoid function, a ReLU function, or in some instances, various combinations of nonlinear operators. In another example, an ALF design may define one or more clip operators, in addition to one or more other non-clip operators (e.g., shrinkage, sigmoid, ReLU, logistic activation function, etc.).

In addition, an ALF design may define various filtering operations (e.g., bilateral filters, adaptive filters, Gaussian filters, neural network (NN)-based filters, Sample Adaptive Offset (SAO) filters, averaging filters, Laplacian filters, etc.) that video encoder 200 and video decoder 300 may utilize alone, in conjunction with one another, or in conjunction with one or more nonlinear operations. In an illustrative example, video encoder 200 and video decoder 300 may apply a first ALF design to a first sample, where the first ALF design defines a nonlinear operation. In addition, video encoder 200 and video decoder 300 may apply a second ALF design to a second sample. In such examples, the first ALF design and the second ALF design may, in some instances, define different operations, parameters, and/or a different order for combining the same or different types of operations (e.g., order of compositions). In an example, video encoder 200 may adaptively determine the different ALF designs based on predefined differences between the samples or based on other coding information for the samples.

In some examples, an ALF design may define an order of composition that defines the ALF process. In an illustrative example, the ALF design may define both a first operation and a second operation, where the ALF design includes syntax elements that define an order for the two example operations. In an illustrative example, the syntax elements may define an order that includes the first operation being followed by the second operation, where the first operation may apply to the input samples of the ALF prior to the second operation applying to the samples output from the first operation. In a non-limiting example, the first operation may include application of a sigmoid function followed by application of a bilateral filtering operation and/or a NN-based filtering operation. In another example, the first operation may include application of a sigmoid function as part of a NN operator. In such examples, a second operation that follows the first operation may include a bilateral filter.

In some examples, an ALF process of an ALF design may include a single filtering operation. The single filtering operation may include one or more filters, such as one or more NN-based filters or one or more bilateral filters. In such examples, video encoder 200 and video decoder 300 may apply the one or more filters of the filtering operation to a set of input samples. In some examples, video encoder 200 and video decoder 300 may determine, from an input sample, one or more sample subsets. In such examples, video encoder 200 and video decoder 300 may, prior to the ALF process, set certain filter coefficients for various subsets of a sample to '0'. In this way, video encoder 200 and video decoder 300 may isolate, from a sample, subsets of samples to provide as input to the one or more ALF processes of the ALF design. In some examples, video encoder 200 and video decoder 300 may apply the one or more filters of the filtering operation to the one or more sample subsets to compensate the samples for the various quantization errors incurred, such as nonlinear quantization errors incurred during the coding or decoding process.

Figure 10:
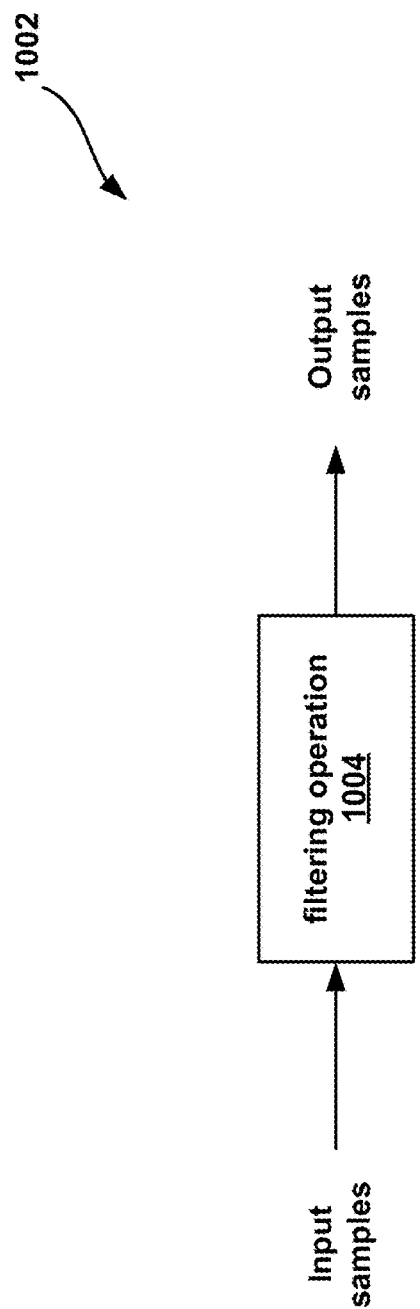
FIG. 10 is conceptual diagram illustrating an example adaptive loop filtering processes, in accordance with one or more of the various techniques disclosed herein.
Figure 11:
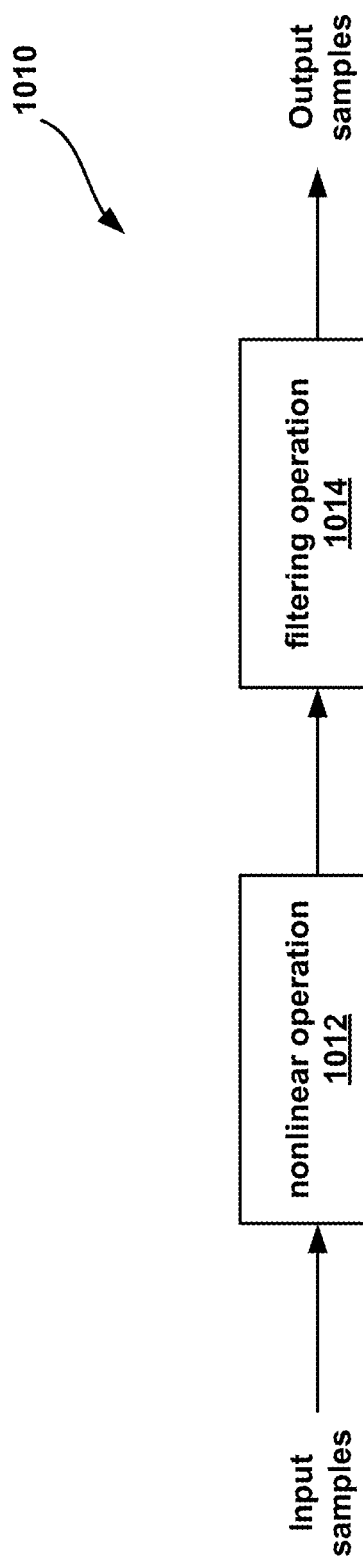
FIG. 11 is a conceptual diagram illustrating an example adaptive loop filtering process, in accordance with one or more of the various techniques disclosed herein.
Figure 12:
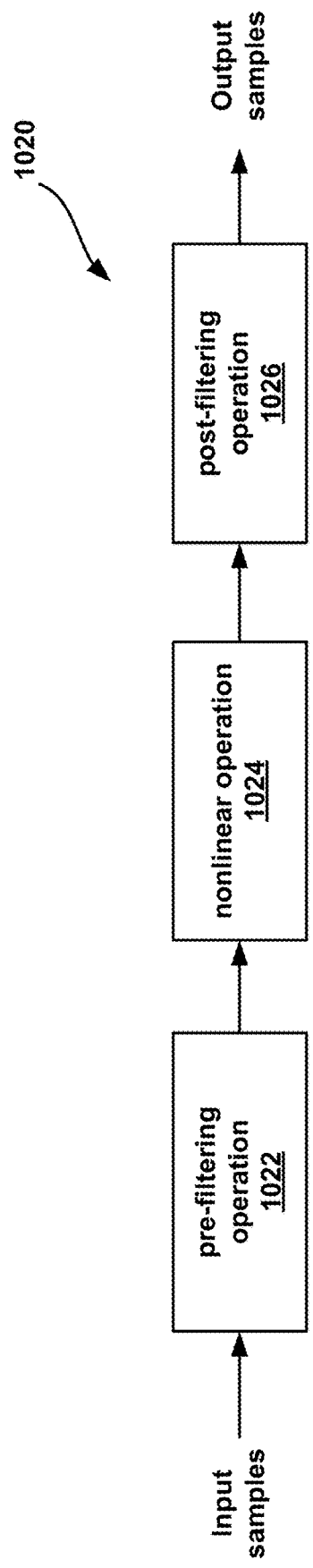
FIG. 12 is a conceptual diagram illustrating an example adaptive loop filtering process, in accordance with one or more of the various techniques disclosed herein.

FIGS. 10-12 are conceptual diagrams illustrating example adaptive loop filtering processes, in accordance with one or more of the various techniques disclosed herein. In FIGS. 10-12, process 1002 includes a single filtering (e.g., ALF) operation, process 1010 includes a nonlinear operation followed by a filtering operation, and process 1020 is an example built by cascading process 1002 and 1010. In the example of FIGS. 10-12, process 1020 includes a pre-filtering operation, followed by a nonlinear operation, followed by a post-filtering operation. The following adaptive loop filtering designs/techniques may be applied individually or may be used together in any combination.

As described, the example adaptive loop filtering processes may be applied individually or may be used together in any combination. In some examples, video encoder 200 and video decoder 300 may define a particular ALF design based on a standalone filtering operation or based on a standalone nonlinear operation. In some examples, video encoder 200 and video decoder 300 may define a particular ALF design based on a combination of one or more filtering operations and/or one or more nonlinear operations. Example ALF processes and designs, including various standalone operations and/or combinations of standalone operations, are described with reference to FIGS. 10-12. In an example, a standalone nonlinear operation may include application of a cascading nonlinear operator to an input sample.

An adaptive loop filtering process may be defined based on following processes: (a) video encoder 200 and video decoder 300 may apply ALF as a single step filtering operation (process 1002); (b) video encoder 200 and video decoder 300 may apply ALF as a nonlinear operation to input samples, followed by filtering the resulting samples (process 1010); and/or (c) video encoder 200 and video decoder 300 may apply ALF as a pre-filtering, a nonlinear operation, and a post-filtering operation. This case is an example obtained by cascading (a) and (b), where first (a) is used for pre-filtering and then b) is used for nonlinear operation and post-filtering (process 1020). An ALF process may be defined based on combinations of (a), (b) and (c). In such examples, video encoder 200 may encode a syntax element (e.g., an index) to determine among multiple adaptive loop filtering processes, such as those defined based on (a), (b) and (c). In addition, video decoder 300 may decode the syntax element and apply the indicated adaptive loop filtering process. As described herein, ALF designs based on (a), (b) and (c) include cascaded versions of each. In an example, (a) and (b) can be cascaded multiple times, so the filtering process may include multiple stages of pre- and post-filtering with nonlinear operations in between.

FIG. 10 is a conceptual diagram illustrating an example ALF process 1002, in accordance with one or more of the various techniques disclosed herein. As shown, ALF process 1002 includes a single filtering operation 1004. In an example, the single filtering operation 1004 may include an adaptive loop filtering operation. In some examples, video encoder 200 and video decoder 300 may utilize ALF process 1002 during video encoding and video decoding. In an example, video encoder 200 may determine to utilize ALF process 1002 as a current ALF design.

In an illustrative example, ALF process 1002 includes applying filtering operation 1004 to a set of input samples. In such examples, video encoder 200 or video decoder 300 may filter input samples through application of a single-pass filtering operation 1004 and produce a resulting set of filtered output samples.

In some examples, an input sample may include a subset of samples. In such examples, the subset of samples may be targeted for filtering by applying filter coefficients having a coefficient value of 0 to samples that are not included with a particular targeted subset. In some examples, each set of input samples may include one or more sample subsets. In such examples, ALF process 1002 may include applying filtering operation 1004 to a first subset of a first input sample.

FIG. 11 is a conceptual diagram illustrating an example ALF process 1010, in accordance with one or more of the various techniques disclosed herein. As shown, ALF process 1010 includes a nonlinear operation 1012 followed by a filtering operation 1014. In some examples, video encoder 200 and video decoder 300 may utilize ALF process 1010 during video encoding and video decoding. In an example, video encoder 200 may determine to utilize ALF process 1010 as a current ALF design.

In an illustrative example, ALF process 1010 includes the application of nonlinear operation 1012 followed by filtering operation 1014. In such examples, ALF process 1010 includes applying nonlinear operation 1012 to a set of input samples, and then applying a filtering operation 1014 that involves filtering those samples that result from the application of nonlinear operation 1012. ALF process 1010 may be similar to ALF process 1002 in that both include the application of a filtering operation. ALF process 1010, however, includes nonlinear operation 1012, in addition to filtering operation 1014. In performing nonlinear operation 1012, video encoder 200 and video decoder 300 may perform a single nonlinear operation or a combination of cascaded nonlinear operations.

In some examples, an input sample may include a subset of samples. In such examples, the subset of samples may be targeted for filtering by applying filter coefficients having a coefficient value of 0 to samples that are not included with a particular targeted subset. In some examples, each set of input samples may include one or more sample subsets. In such examples, ALF process 1010 may include applying nonlinear operation 1012 and filtering operation 1014 to a first subset of a first input sample.

In some examples, filtering operation 1014 may include the same type of filter that video coder 200 and video decoder 300 may use to implement filtering operation 1004. In an example, video coder 200 may be configured to determine an ALF process to apply from among a number of different ALF processes. In such instances, video encoder 200 may determine an ALF process 1010 in a first instance that includes the same or a different type of filtering operation 1014 compared to that of filtering operation 1004 of a potential ALF process 1002 that video coder 200 may determine in a second instance.

FIG. 12 is a conceptual diagram illustrating an example ALF process 1020, in accordance with one or more of the various techniques disclosed herein. In some examples, video encoder 200 and video decoder 300 may utilize ALF process 1020 during video encoding and video decoding. In an example, video encoder 200 and video decoder 300 may determine to utilize ALF process 1020 as a current ALF design. In an example, video encoder 200 may determine to utilize ALF process 1020 based on coding information available to video encoder 200 during an encoding process.

In an illustrative example, ALF process 1020 includes the application of a pre-filtering operation 1022, followed by a nonlinear operation 1024, followed by a post-filtering operation 1026. In some examples, ALF process 1020 is implemented as a cascade of ALF process 1002 and ALF process 1010. That is, ALF process 1020 represents an example ALF design that is built by cascading ALF process 1002 and ALF process 1010. In some examples, video encoder 200 and video decoder 300 may utilize ALF process 1002 to apply pre-filtering operation 1022 and may utilize ALF process 1010 to apply nonlinear operation 1024 and post-filtering operation 1026 to then implement ALF process 1020.

In some examples, pre-filtering operation 1022 may correspond to filtering operation 1004 of FIG. 10 and/or filtering operation 1014 of FIG. 11. Similarly, post-filtering operation 1026 may correspond to filtering operation 1004 of FIG. 10 and/or filtering operation 1014 of FIG. 11. In addition, pre-filtering operation 1022 may, in some examples, include a different type of filter compared to that of post-filtering operation 1026. In some examples, however, pre-filtering operation 1022 may include the same type of filter as post-filtering operation 1026. In such examples, the filter coefficients may or may not be the same for both filters of filtering operation 1022 and filtering operation 1026. In addition, nonlinear operation 1024 may, in some examples, correspond to nonlinear operation 1012 of FIG. 11. In some examples, however, nonlinear operation 1012 may include a different type of nonlinear operator compared to that of nonlinear operation 1024. That is, nonlinear operation 1012 may include a shrinkage operator and nonlinear operation 1024 may include a sigmoid function. In any case, video coder 200 and video decoder 300 may apply ALF process 1020 to a set of input samples, such as to a first subset of a first input sample, to output a filtered set of output samples from post-filtering operation 1026.

In some examples, a single ALF design may be defined based on various combinations of (a) ALF process 1002, (b) ALF process 1010, and (c) ALF process 1020. In an illustrative example, a video coder may determine to utilize a single ALF design that includes a cascaded version of one or more ALF processes, such as a cascade of the example ALF processes described with reference to FIGS. 10-12. That is, the single ALF design may include a cascaded version of multiple ALF processes. In an illustrative example, ALF process 1002 may be cascaded together with ALF process 1010 to form a single ALF design or a portion of an ALF design. In addition, a single ALF design may include multiple cascading ALF processes. In an example, ALF process 1002 may be cascaded together multiple times with ALF process 1010 or otherwise for multiple iterations following execution of ALF process 1002 and ALF process 1010 of the ALF design. That is, a single ALF design may include a multiple cascading of various ALF processes, such as a multiple cascading between ALF process 1002 and ALF process 1010.

In some examples, the filtering process may include multiple stages of pre-filtering operations (e.g., pre-filtering operation 1022) and/or post-filtering operations (e.g., post-filtering operation 1026) with video encoder 200 applying one or more nonlinear operations between the pre-filtering operation(s) and post-filtering operation(s). In such examples, the one or more nonlinear operations may include one or more nonlinear operations 1024 that may, in turn, include the application of one or more different nonlinear operators (e.g., a ReLU and clip combination).

As used herein, a pre-filtering operation (e.g., pre-filtering operation 1026) may generally refer to a filtering operation of an adaptive loop filtering process that precedes application of a nonlinear operation (e.g., nonlinear operation 1012, nonlinear operation 1024, etc.) included as part of the ALF design. Likewise, a post-filtering operation (e.g., post-filtering operation 1026, filtering operation 1014, etc.) may generally refer to a filtering operation of an adaptive loop filtering process that follows application of the nonlinear operation. In some instances, the pre-filtering operation may differ from the post-filtering operation, such as in terms of a relative size of the respective operations. In an example, the pre-filtering operation may generally include a smaller (e.g., simpler) filter compared to the post-filtering operation, which may, in turn, include a filter of a larger size.

In some examples, video encoder 200 may code a syntax element (e.g., an index) in order to determine one or more ALF processes from among multiple ALF processes. In such examples, the syntax element may define one or more ALF designs video encoder 200 has utilized, or will otherwise imminently utilize, during a video coding process. In an example, the one or more ALF processes may be determined from among ALF process 1002, ALF process 1010, ALF process 1020, or variations/combinations thereof. In some examples, video encoder 200 may encode a syntax element indicating one of a plurality of adaptive loop filtering processes for video data, wherein the plurality of adaptive loop filtering processes include (a) a single filtering operation (e.g., ALF process 1002), (b) a nonlinear operation followed by a filtering operation (e.g., ALF process 1010), and (c) a pre-filtering operation, followed by a nonlinear operation, followed by a post-filtering operation (e.g., ALF process 1020). In addition, video encoder 200 may code a syntax element that indicates cascaded versions of the adaptive loop filtering processes (a) ALF process 1002, (b) ALF process 1010, and/or (c) ALF process 1020.

In an illustrative example, video encoder 200 may encode a syntax element that indicates more than one cascaded version of ALF process 1010 and ALF process 1020. In an example, the syntax element may indicate an order of compositions that indicate a cascade of ALF process 1010 followed by ALF process 1020 followed by another ALF process 1020 followed by ALF process 1010. In a non-limiting example, the various ALF processes that are cascaded together, as indicated by the syntax element, may include the same types of filters or nonlinear operators for each corresponding operations of each ALF process. In such examples, the corresponding parameters (e.g., filter coefficients) for the various ALF process cascaded together may be different. In any case, the syntax element may indicate that a particular ALF design may be derived with one cascade or a plurality of cascaded ALF processes, such as a plurality of cascades of ALF processes 1002, 1010, and 1020. In another illustrative example, the syntax element may indicate a first cascade of ALF process 1020 with ALF process 1002 and/or ALF process 1010, a first cascade of ALF process 1002 with ALF process 1020 and/or ALF process 1010, a first cascade of ALF process 1020 with ALF process 1002 or, or a first cascade having various variations therefrom. In such examples, the syntax element may further indicate a second cascade of ALF process 1002, ALF process 1010, and/or ALF process 1020 with one or more of the first cascades. In this way, video encoder 200 may encode a syntax element that indicates to video decoder 300, multiple cascades of ALF processes, such as those illustrated in FIGS. 10-12.

In such examples, video encoder 200 may code a syntax element that indicates a particular ALF process, or that indicates, in some instances, a combination of ALF processes, including a cascade order of the ALF processes (e.g., an order of compositions). In an illustrative example, the syntax element may indicate that a combination of ALF processes includes one or more applications of a nonlinear operation, such as application of nonlinear operation 1012 of FIG. 11, nonlinear operation 1024 of FIG. 12, or a variation/combination thereof. In another example, the syntax element may indicate an ALF design that includes a single-pass through of one of ALF processes 1002, 1010, 1020, or variations/combination thereof. In any event, the syntax element defines the one or more ALF processes utilized during the video coding. As such, the syntax element effectively defines the one or more ALF designs utilized by video encoder 200 during a video coding process.

In such examples, video decoder 300 may then decode the syntax element to determine the one or more ALF processes indicated by the syntax element. As such, video decoder 300 may then apply the ALF design as indicated. Depending on the syntax element, the indicated ALF design may include a single ALF process or a combination of ALF processes (e.g., a cascade of ALF processes 1002, 1010, or 1020, multiple cascades of ALF processes 1002, 1010, or 1020, etc.). In an illustrative example, video decoder 300 may apply an ALF design that, based on the syntax element, includes a combination of multiple ALF processes, such as the example ALF processes described with reference to FIGS. 10-12. That is, video decoder 300 may decode a syntax element that has been encoded by video encoder 200. In another illustrative example, video decoder 300 may perform an adaptive loop filtering process based on the syntax element, where the syntax element indicates a nonlinear operation to be applied to video data that is combined (e.g., cascaded) together with one or more nonlinear operations or filtering operations. As described herein, the corresponding parameters (e.g., filter coefficients) for the various ALF process combined together may be the same or different and the types of nonlinear operators or filtering operations may be the same or different depending on what decoding the syntax element indicates to video decoder 300.

Filtering Operations in Adaptive Loop Filter (ALF) Designs

In some examples, an ALF design may include a filtering operation (which can also be used as pre-filtering and post-filtering) that includes one or more filters that have been predefined and/or adaptively learned/trained. In an example, video encoder 200 may utilize a predefined filter in a pre-filtering operation or in a post-filtering operation. In another example, video encoder 200 may utilize a filtering operation that video encoder 200 has adaptively learned/trained. If video encoder 200 adaptively learns a filtering operation, video encoder 200 may signal filter parameters/coefficients for the adaptively learned filtering operation. When a filter is predefined, however, video encoder 200 may forego signaling filter coefficients for the predefined filter. In an illustrative example, pre-filtering operation 1022 of FIG.

12 may be predefined and post-filtering operation 1026 of FIG. 12 may be adaptively learned/trained. In such instances, video encoder 200 signals post-filtering parameters/coefficients. In another example, pre-filtering operation 1022 of FIG. 12 may be adaptively learned/trained and post-filtering operation 1026 of FIG. 12 may be predefined.

In some examples, video encoder 200 may utilize pre-filtering operation 1022 of FIG. 12. Pre-filtering operation 1022 may include one or more filters that, in some instances, have been predefined. Additionally, video encoder 200 may utilize post-filtering operation 1026 of FIG. 12, where post-filtering operation 1026 may include one or more filters that have been adaptively learned/trained. In such examples, video encoder 200 may signal parameters/coefficients for the one or more filters of post-filtering operation 1026. Video encoder 200, however, may effectively forego signaling for the one or more predefined filters of pre-filtering operation 1022.

In some examples, an ALF design may include multiple predefined filter candidates and may include multiple adaptive filter candidates. Video encoder 200 may signal an index to determine which filter is used among multiple candidates.

In some examples, the filters may be signaled hierarchically. In an example, video encoder 200 may signal the filters hierarchically. An index (e.g., an APS index described above) may be signaled for a group (e.g., set) of filters, then another index may be signaled to identify a specific filter.

In an illustrative example, video encoder 200 may signal an index, such as an APS index described herein, for a group of filters (e.g., a set of filters). In such examples, video encoder 200 may signal another index to identify a specific filter, such as a filter of the group of filters. In some examples, a set of filters may include only one filter or may include multiple filters. In any case, video encoder 200 and video decoder 300 may signal a first index for a set of filters and may signal a second index for a specific filter from the set of filters.

In some examples, video decoder 300 may infer a filter without signaling. In an example, video decoder 300 may infer a filter based on side information that may be available to video decoder 300. In some examples, the side information may include classification information.

For example, a predefined filter may be defined as a simple summation, averaging or subtraction of multiple input samples. In an example, a predefined filter may be defined as an averaging or a subtraction of multiple input samples. In such examples, video encoder 200 and video decoder 300 may determine the sample locations based on the classification (e.g., classification information, side information). In some examples, the filter support (e.g., diamond-shaped filter support, etc.) may depend on classification (e.g., classification information). That is, the filter support may be defined by the class index of an input block.

Nonlinear Operations in Adaptive Loop Filter (ALF) Designs

In some examples of adaptive loop filtering, video encoder 200 and video decoder 300 may include an additional pre-processing operation (e.g., nonlinear operation 1012 and/or nonlinear operations 1024). As such, the pre-processing operation may include an application of one or more nonlinear operators followed by a filtering operation (e.g., filtering operation 1014 and/or filtering operation 1026). In such examples, video encoder 200 and video decoder 300 may apply the additional pre-processing operation to the input samples of the filtering process. The pre-processing operation may be represented as a function of information available to the video coder. In some examples, the pre-processing operation may be represented as a function of the sample/block coordinate and/or input sample value and/or color component. In addition, the video coder may apply multiple pre-processing functions in any one of a number of different combinations of nonlinear operators.

In some examples, video encoder 200 may identify a particular pre-processing function with or by an indicator. Video encoder 200 may transmit the indicator to video decoder 300. In some examples, video decoder 300 may identify the particular pre-processing function by the indicator. In another example, video decoder 300 may derive the indicator without signaling. In some examples, video decoder 300 may derive the indicator as part of a pre-processing function determination. In such examples, video decoder 300 may determine the pre-processing function based on information available to video decoder 300 while video decoder 300 decodes the video data. In an example, video decoder 300 may determine the pre-processing function, without signaling, based on sample position, block size, sample value, color component, or based other available information.

In another example, video coder 200 and video decoder 300 may perform an adaptive loop filtering process that includes a first filtering operation (e.g., a pre-filtering operation) and a second filtering operation (e.g., a post-filtering operation). As such, the first filtering operation may be cascaded with a nonlinear operation. The nonlinear operation may include nonlinear operators that are a function of the sample/block coordinate and/or input sample value, or color component. As such, the nonlinear operation may be cascaded with the second filtering operation. In such instances, the nonlinear operator may be identified with an indicator, which may be transmitted to video decoder 300 or may be derived by video decoder 300 without signaling.

In some examples, the video decoder 300 may derive the nonlinear operator based on the sample position, block size, sample value, color component and any other available information. The nonlinear operator may be one of: (a) shrinkage operator, (b) sigmoid function, or (c) ReLU function, or any combination thereof. In addition, the nonlinear operator may include a clipping operator that is part of the adaptive loop filtering process. As described, the adaptive loop filtering process may follow a pre-clipping operation. In such instances, a plurality of clipping operations may be applied to the video data before and during the adaptive loop filtering process. In another example, a pre-clipping operation may precede the adaptive loop filtering process, with the adaptive loop filtering process including one or more of (a) shrinkage operator, (b) sigmoid function, or (c) ReLU function, (d) a second clipping operation, or any combination thereof.

The utilized pre-processing functions, which are applied to a block/slice/tile/brick/picture, from a plurality of available functions may be signaled in a parameter set and/or slice header. In some examples, video encoder 200 may signal the utilized pre-processing functions in a parameter set and/or slice header. In an illustrative example, video encoder 200 may determine a nonlinear operator from a plurality of available nonlinear operators. Video encoder 200 may apply the nonlinear operator to a block/slice/tile/brick/picture. In addition, video encoder 200 may then signal the nonlinear operator, such as in a parameter set and/or slice header.

In some examples, video encoder 200 and video decoder 300 may utilize, in a particular ALF design, one or more of the following example nonlinear operators. In an example, the video coder may utilize one or more combinations of the following example nonlinear operators in the particular ALF design:

Clip operation with parameter α≥0:

$$Clip_\alpha(x_i) = \begin{cases} \alpha, & x_i > \alpha \\ x_i, & -\alpha \le x_i \le \alpha \\ -\alpha, & x_i < -\alpha \end{cases}$$

Shrinkage operation with parameter α≥0:

$$Shrink_\alpha(x_i) = \begin{cases} x_i - \alpha, & x_i > \alpha \\ 0, & -\alpha \le x_i \le \alpha \\ x_i + \alpha, & x_i < -\alpha \end{cases}$$

Sigmoid function with parameter α:

$$Sigmoid_\alpha(x_i) = \frac{1}{1 + e^{-\alpha x_i}}$$

ReLU (rectified linear unit) function:

$$ReLU(x_i) = \max(0, x_i)$$

where $x_i$ denotes an input sample at location/position i. A nonlinear operation is defined by the type of the nonlinear operator (e.g., clip, shrinkage, sigmoid, and ReLU functions) and parameters (e.g., α parameters) of the nonlinear operator or for multiple nonlinear operators, parameters of the nonlinear operators (e.g., combination of nonlinear operators).

In some examples, video encoder 200 and video decoder 300 may cascade multiple nonlinear operators, such as by cascading different types of nonlinear operators together to represent a combination of nonlinear operators. Mathematically, arbitrary nonlinear operators $f_1$ and $f_2$ can be cascaded so that the output sample $y_i$ is obtained by applying a composition of two functions on input sample $x_i$ as follows:

$$y_i = f_2(f_1(x_i))$$

In an illustrative example, video encoder 200 and video decoder 300 may apply a clip operator following application of a shrinkage operator. In some examples, the cascading (e.g., chaining) of nonlinear operators may be represented mathematically as follows:

$$Clip_{\alpha_2}(Shrink_{\alpha_1}(x_i)),$$

where $\alpha_1$ and $\alpha_2$ denote parameters for shrinkage and clip operations, respectively.

In another example, video encoder 200 and video decoder 300 may apply a clip operator following application of a ReLU operator. In such examples, the cascading of nonlinear operators may be represented mathematically as follows:

$$Clip_{\alpha_2}(ReLU(x_i)),$$

where $\alpha_2$ denotes the parameters for the clip operation. The ReLU operator may, in some instances, may apply based on the combination of neighboring pixels that effectively neighbor $x_i$.

In an example ALF design, video encoder 200 and video decoder 300 may apply nonlinear operations (see process 1012 and process 1024) to a subset of samples of an input. In an illustrative example, video encoder 200 may apply nonlinear operation 1012 of FIG. 11 or nonlinear operation 1024 of FIG. 12 to the subset of samples. In some examples, video encoder 200 and video decoder 300 may apply nonlinear operation 1012 to a subset of samples by applying one or more nonlinear operators to a single sample or by applying one or more nonlinear operators to multiple samples.

A flag may be signaled to indicate whether a nonlinear operation is applied to any of the samples or not. In some examples, video encoder 200 may signal a flag to indicate that the video encoder 200 has performed one or more nonlinear operations on one or more samples. In an example, video encoder 200 may signal a flag to indicate that video encoder 200 has applied a nonlinear operator or multiple nonlinear operators to at least one sample of the ALF process. If the flag is enabled, then nonlinear operation parameters can be signaled for each input sample or for a subset of samples. In another example, video encoder 200 may signal a flag to indicate that video encoder 200 has applied a particular loop filter (e.g., a bilateral filter) following a nonlinear operator. In some examples, however, video coder 200 may signal nonlinear operation parameters, such as for each input sample, for a subset of samples, etc., without signaling a flag.

In some examples, video encoder 200 and video decoder 300 may apply different nonlinear operators for different input samples (e.g., subsequent input samples). That is, video encoder 200 and video decoder 300 may, as part of an ALF process, apply a first nonlinear operator to a first input sample and may subsequently apply a second nonlinear operator to a second input sample, where the first input sample and second input sample may define different types of input samples (e.g., luma samples, chroma samples, etc.).

In one example, a single type of nonlinear function (e.g., clip) with different α parameters can be used for each input sample. In some examples, video encoder 200 and video decoder 300 may utilize, for each input sample, a single type of nonlinear operator (e.g., clip, sigmoid, etc.), where each nonlinear operator is represented by different parameters (e.g., one or more α parameters). That is, video encoder 200 and video decoder 300 may utilize, for a first input sample, a sigmoid nonlinear operator having a first set of parameters, and in turn, may utilize, for a second input sample, a sigmoid nonlinear operator having a second set of parameters, where the first set of parameters may advantageously differ from the second set of parameters. The differences in parameters may be based on the type of sample or other coding information that cause video encoder 200 and video decoder 300 to apply certain parameters or certain operations under various coding circumstances.

In another example, more than one type of nonlinear functions may be used (e.g., clip and shrinkage) with different α parameters. In some examples, video encoder 200 and video decoder 300 may utilize in a single ALF design multiple types of nonlinear operators (e.g., clip and shrinkage, clip and ReLU, clip and sigmoid, shrinkage and sigmoid, etc.). In such examples, each nonlinear operator may be represented by different parameters (e.g., α parameters), or in some instances, may not include a α parameter, such as with a ReLU nonlinear operator.

The order of cascading of these functions (i.e., order of compositions) may be adaptive and signalled. Video encoder 200 and video decoder 300 may combine such nonlinear operators to create cascading nonlinear operators (e.g., a composition of nonlinear operators). In such examples, the order of cascading of these nonlinear operators (e.g., an order of compositions, cascade order, etc.) may be adaptive and/or signalled. In an example, video encoder 200 may adaptively learn an order of compositions, whereas, in other instances, the order of compositions may be predefined (e.g., non-signalled).

For each input sample or a subset of samples, both type of nonlinear operations (e.g., clip, shrinkage, sigmoid) and the corresponding parameters (i.e., α parameters) can be signaled. In signalling examples, video encoder 200 may signal both the type of nonlinear operator (e.g., clip, shrinkage, sigmoid, ReLU, etc.) and the corresponding parameters (e.g., α parameters). Video encoder 200 may signal both operator type and parameters for each input sample or in some instances, for a sample subset.

In some examples, video encoder 200 and video decoder 300 may assign each nonlinear operation to an index. In another example, video encoder 200 may assign each pair of nonlinear operator types (e.g., clip and ReLU, clip and sigmoid, ReLU and sigmoid, etc.) and the corresponding parameters (e.g., α parameters) to an index.

In such examples, video coder 200 may signal an index value to specify the one or more nonlinear operations applied to a sample ($x_i$), where each nonlinear operations may include application of one or more nonlinear operators. In some examples, video encoder 200 may use fixed length codes, unary codes or truncated unary codes to signal the index information.

In another example, nonlinear function types and α parameters can be signaled separately. In an example, video coder 200 may signal the one or more types of nonlinear operators (e.g., sigmoid, clipping, etc.) separately from corresponding α parameters (e.g., sigmoid parameters, clipping parameters, etc.). That is, video coder 200 may signal nonlinear operator types separate from the parameters (e.g., a) of the nonlinear operators, and as such, video decoder 300 may determine that separate signals are indicative of both the type of nonlinear operator and corresponding parameters of the nonlinear operator, if any.

In some examples, the parameters may be filter dependent or position dependent. In an example, the parameters for a nonlinear operation may depend on a pre-filtering operation that precedes the nonlinear operation and/or a post-filtering operation that follows the nonlinear operation. In another example, the parameters of the nonlinear operators may be position dependent, such as dependent on the position of the input samples relative to other samples of the respective coding block.

In some examples, a separate set of nonlinear operations can be defined for luma and chroma channels. In an example, video encoder 200 may define a first set of nonlinear operations for luma components and may define a second set of nonlinear operations for chroma components. In some examples, the first set of nonlinear operations may resemble the second set of nonlinear operations, such as by including the same nonlinear operators. In another example, the first set of nonlinear operations and the second set of nonlinear operations may include separate nonlinear operations. In addition, video encoder 200 may utilize separate ALF processes for each of the channels, where the separate ALF processes may be the same or different from one another.

In some examples, a separate set of nonlinear operations can be defined based on coding information of a block/slice/tile group/picture/tile/brick, such as prediction type, number of non-zero quantized coefficients, quantization parameters, motion vectors, intra modes and so on. In an example, video encoder 200 may define a separate set of nonlinear operations based on coding information of a block/slice/tile group/picture/tile/brick, such as based on prediction type, number of non-zero quantized coefficients, quantization parameters, motion vectors, intra modes, etc. In an illustrative example, video encoder 200 may define a first set of nonlinear operations for a first ALF design based on a first prediction type and may define a second set of nonlinear operations for a second ALF design based on a second prediction type, where the first set of nonlinear operations may be separate from the second set of nonlinear operations. In some examples, the first set of nonlinear operations for the first ALF design may differ from the second set of nonlinear operations for the second ALF design. In another example, video encoder 200 may assign different sets of parameters for different quantization parameter (QP) ranges. In such examples, video encoder 200 may encode a syntax element that indicates the parameters, where the parameters depend on the QP (e.g., range of QPs) that video encoder 200 utilizes to code a particular block/slice/tile group/picture/tile/brick. Video decoder 300 may decode the syntax element as such to determine the parameters (e.g., filter coefficients, nonlinear operator parameters, etc.). Video decoder 300 may then perform the indicated ALF process based on the encoded parameters indicated by the decoded syntax element.

Examples of nonlinear operation candidates include:
a. $\{Clip_{\alpha=6}, Clip_{\alpha=32}, Clip_{\alpha=181}, Clip_{\alpha=1024}\}$
b. $\{Clip_{\alpha=6}, Clip_{\alpha=32}, Clip_{\alpha=181}, Clip_{\alpha=1024}, Shrink_{\alpha=32}, Shrink_{\alpha=64}, Shrink_{\alpha=128}, Shrink_{\alpha=256}\}$
C. $\{Clip_{\alpha=6}, Clip_{\alpha=32}, Clip_{\alpha=181}, Clip_{\alpha=1024}, ReLU, Shrink_{\alpha=64}, Shrink_{\alpha=128}, Shrink_{\alpha=256}\}$ where the first example consists of four candidates and the other two examples consist of eight candidates. In some examples, video encoder 200 and video decoder 300 may define the choice of a based on the BD. The video coder may then scale a accordingly.

In some examples, when video encoder 200 and video decoder 300 applies a clipping operation or a shrinkage operation to a set of filter coefficients, the dynamic range of the coefficients may, in turn, change (e.g., increase or decrease). In such instances, video encoder 200 and video decoder 300 may adjust a coding operation accordingly. In one example, when video encoder 200 applies $Shrink_\alpha(x_i)$, video encoder 200 may adjust the coding operation to signal $x_i-\alpha$, rather than $x_i$.

Figure 13:
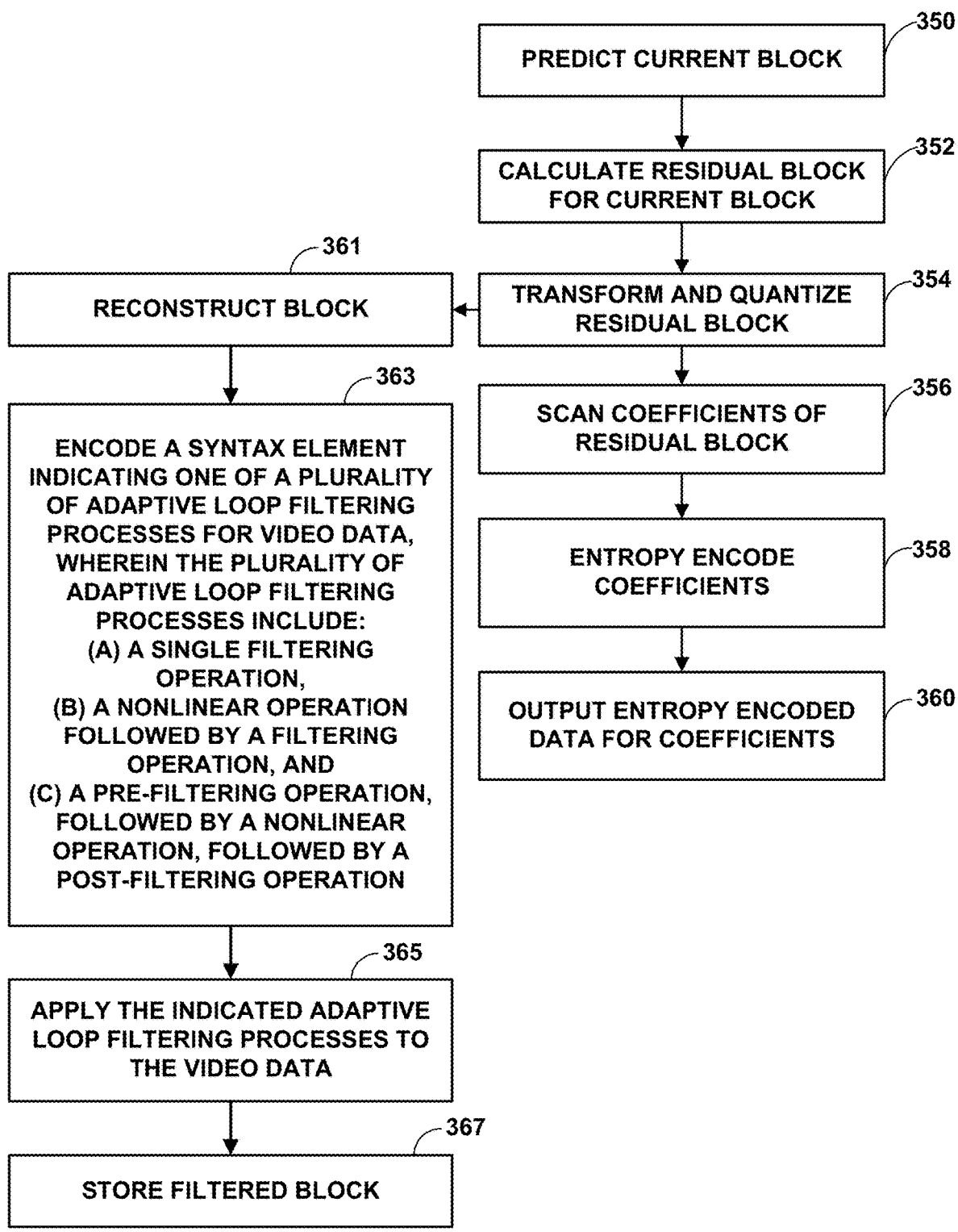
FIG. 13 is a flowchart illustrating an example encoding method, in accordance with one or more of the various techniques disclosed herein.

FIG. 13 is a flowchart illustrating an example method for encoding a current block. The current block may comprise a current CU. Although described with respect to video encoder 200 (FIGS. 1 and 3), it should be understood that other devices may be configured to perform a method similar to that of FIG. 13.

In this example, video encoder 200 initially predicts the current block (350). For example, video encoder 200 may form a prediction block for the current block. Video encoder 200 may then calculate a residual block for the current block (352). To calculate the residual block, video encoder 200 may calculate a difference between the original, unencoded block and the prediction block for the current block.

Video encoder 200 may then transform and quantize coefficients of the residual block (354). Next, video encoder 200 may scan the quantized transform coefficients of the residual block (356). During the scan, or following the scan, video encoder 200 may entropy encode the transform coefficients (358). For example, video encoder 200 may encode the transform coefficients using CAVLC or CABAC. Video encoder 200 may then output the entropy encoded data of the block (360). In some instances, video encoder 200 may implement a reconstruction loop. For instance, video encoder 200 may implement a reconstruction loop to reconstruct encoded video data using the adaptive loop filtering techniques and/or ALF designs disclosed herein. In accordance with one or more of the various techniques disclosed herein, video encoder 200 may be configured to reconstruct the current block after calculating a residual block and apply one or more ALF processes to the video data (e.g., the unencoded video data).

In an example, after video encoder 200 calculates the residual block for the current block (352) or after video encoder 200 transforms and quantizes the residual block (354), video encoder 200 may be further configured to reconstruct the current block (361). Video encoder 200 may then determine and encode a syntax element indicating one of a plurality of adaptive loop filtering processes for video data, wherein the plurality of adaptive loop filtering processes include (a) a single filtering operation, (b) a nonlinear operation followed by a filtering operation, and (c) a pre-filtering operation, followed by a nonlinear operation, followed by a post-filtering operation (363). In addition, video encoder 200 may apply the adaptive loop filtering processes, including any of the one or more nonlinear operations, to the video data (365), and store the filtered block (367).

In an example, video encoder 200 may apply one or more nonlinear operators 217 to video data during an adaptive loop filtering process. The video encoder 200 may produce from the adaptive loop filtering process a filtered block. In some instances, video encoder 200 may then store the filtered block to memory. In addition, video encoder 200 may encode a syntax element that indicates a manner in which to apply the one or more nonlinear operators.

In another example, video encoder 200 may determine a nonlinear operation and a filtering operation to perform in an adaptive loop filtering process. Video encoder 200 may then perform the adaptive loop filtering process by applying the filtering operation and the nonlinear operation to the video data. In addition, video encoder 200 may encode a syntax element that indicates a manner in which the adaptive loop filtering process was performed. In such examples, the nonlinear operation may include application of one or more nonlinear operators 217 to the incoming video data.

Figure 14:
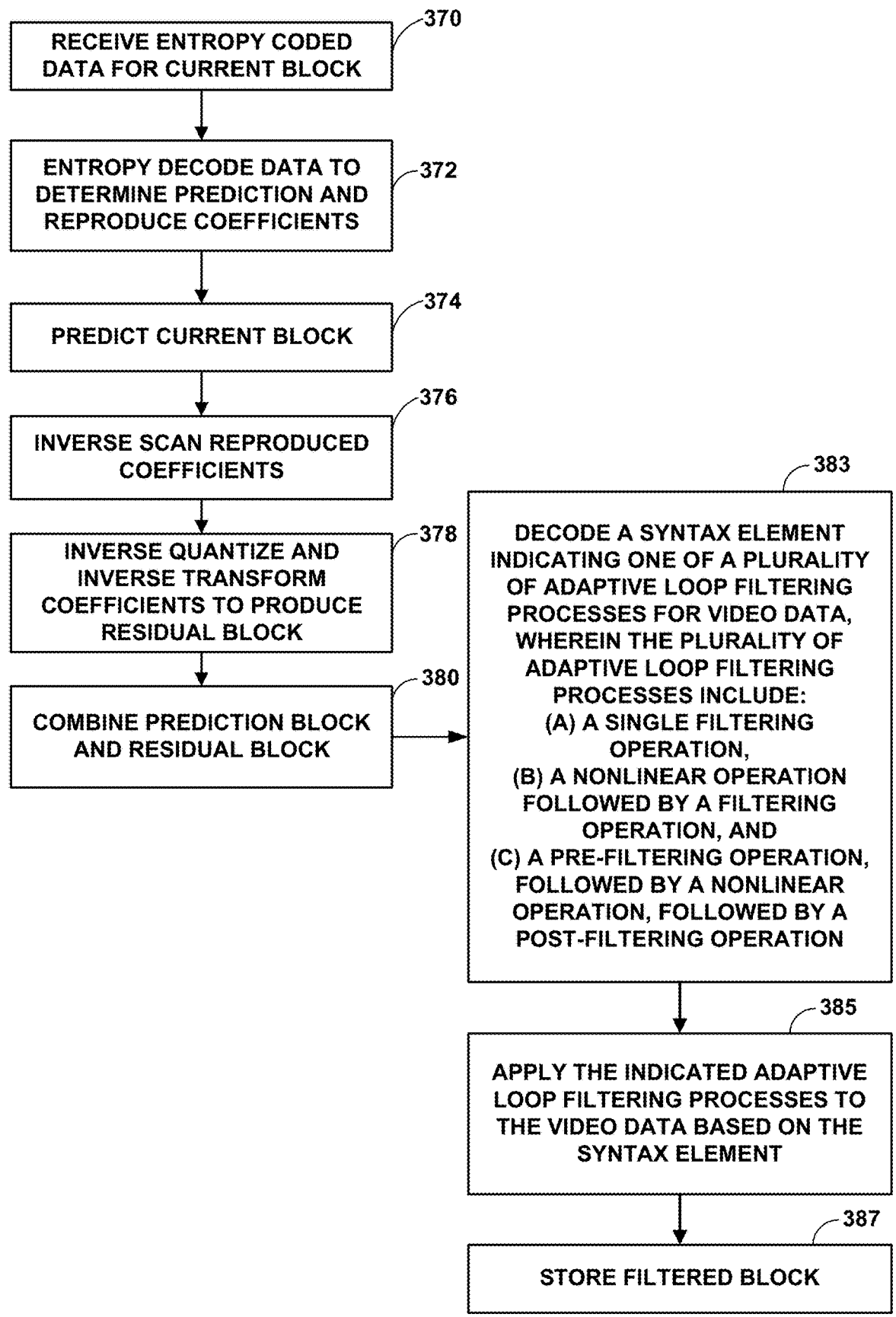
FIG. 14 is a flowchart illustrating an example decoding method, in accordance with one or more of the various techniques disclosed herein.

FIG. 14 is a flowchart illustrating an example method for decoding a current block of video data. The current block may comprise a current CU. Although described with respect to video decoder 300 (FIGS. 1 and 4), it should be understood that other devices may be configured to perform a method similar to that of FIG. 14.

Video decoder 300 may receive entropy coded data for the current block, such as entropy coded prediction information and entropy coded data for transform coefficients of a residual block corresponding to the current block (370). Video decoder 300 may entropy decode the entropy coded data to determine prediction information for the current block and to reproduce transform coefficients of the residual block (372). Video decoder 300 may predict the current block (374), e.g., using an intra- or inter-prediction mode as indicated by the prediction information for the current block, to calculate a prediction block for the current block. Video decoder 300 may then inverse scan the reproduced transform coefficients (376), to create a block of quantized transform coefficients. Video decoder 300 may then inverse quantize and inverse transform the coefficients to produce a residual block (378). Video decoder 300 may ultimately decode the current block by combining the prediction block and the residual block (380).

Video decoder 300 may further decode a syntax element indicating one of a plurality of adaptive loop filtering processes for video data, wherein the plurality of adaptive loop filtering processes include (a) a single filtering operation, (b) a nonlinear operation followed by a filtering operation, and (c) a pre-filtering operation, followed by a nonlinear operation, followed by a post-filtering operation (383), and apply the indicated adaptive loop filtering processes to the video data based on the syntax element (385). Video decoder 300 may then store the filtered block (387).

In an example, following the combining of the prediction block and the residual data, video decoder 300 may decode a syntax element that indicates a manner in which to apply a nonlinear operation to video data during an adaptive loop filtering process. Video decoder 300 may apply the nonlinear operation to the video data based on the syntax element. In some instances, video decoder 300 may store the filtered block to memory.

In another example, following the combining of the prediction block and the residual data, video decoder 300 may decode a syntax element that indicates a manner in which to perform an adaptive loop filtering process. The syntax element may indicate that a nonlinear operation is to be applied to the video data. In addition, video decoder 300 is configured to apply the nonlinear operation in combination with a filtering operation of an adaptive loop filtering process. In addition, video decoder 300 may perform the adaptive loop filtering process based on the syntax element. That is, video decoder 300 may perform the combination of filtering and nonlinear operations as part of an adaptive loop filtering process.

Figure 15:
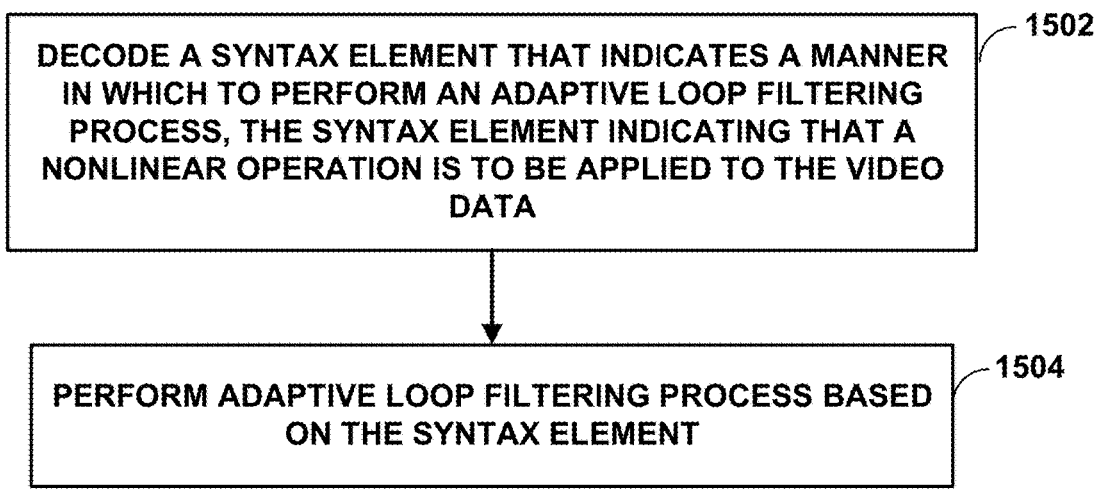
FIG. 15 is a flowchart illustrating an example adaptive loop filtering method, in accordance with one or more of the various techniques disclosed herein.

FIG. 15 is a flowchart illustrating an example adaptive loop filtering method, in accordance with one or more of the various techniques disclosed herein. Although described with respect to video decoder 300 (FIGS. 1 and 4), it should be understood that other devices may be configured to perform a method similar to that of FIG. 15.

In some examples, video decoder 300 may decode a syntax element that indicates a manner in which to perform an adaptive loop filtering process, the syntax element indicating that a nonlinear operation is to be applied to the video data, the nonlinear operation configured to be applied in combination with a filtering operation of the adaptive loop filtering process (1502). In addition, video decoder 300 may perform the adaptive loop filtering process based on the syntax element (1504). In an example, video coder may apply the nonlinear operation and the filtering operation to the video data to produce a filtered block of video data. The nonlinear operation may include application of one or more nonlinear operators 313. Example nonlinear operators 313 include clipping operators, shrinkage operators, sigmoid function, or a ReLU function. In some instances, video decoder 300 may store the filtered block to memory.

In some examples, the syntax element indicates cascaded versions of nonlinear operators 313. In such instances, video decoder 300 may decode the syntax element to determine the cascaded versions of nonlinear operators 313. In another example, the syntax element may indicate the parameters of the nonlinear operation. In an example, the parameters may include a clip value where the nonlinear operation includes a clipping operator.

In some examples, when performing the adaptive loop filtering process, video decoder 300 may first determine an order for combining the nonlinear operation and the filtering operation. In some instances, the order may include a composition of a nonlinear operation followed by a filtering operation or vice versa. In an illustrative example, the order may include applying the nonlinear operation followed by the filtering operation. In such examples, video decoder 300 may apply the nonlinear operation followed by the filtering operation.

In some examples, video decoder 300 may determine the nonlinear operation based on sample position, block size, sample value, or color component. That is, video decoder 300 may be configured to derive the nonlinear operation without signaling. In such examples, video decoder 300 may apply the determined nonlinear operation to input samples of the adaptive loop filtering process.

In some examples, the filtering operation may be predefined or adaptive. In instances where the filtering operation is adaptive, video decoder 300 may determine one or more filter coefficients for the filtering operation. In some examples, video decoder 300 may determine, from side information, whether or not the filtering operation is predefined or adaptive. In an example, video decoder 300 may determine from side information that a given filtering operation is adaptive. In response to the determination, video decoder 300 may implement the adaptive loop filter that includes the nonlinear operation or multiple nonlinear operations. That is, in response to the determination, video decoder 300 enable (e.g., switch on) the adaptive loop filtering process. The side information may include classification information. An adaptive filter may include an adaptively trained filter. In cases involving adaptive filters, video decoder 300 may determine coefficients for the filtering operation with signaling. In an example, video decoder 300 may determine coefficients for all filtering operations that are adaptive.

In some examples, video decoder 300 may apply the filtering operation of the adaptive loop filtering process in a plurality of filtering stages. That is, the filtering operation may include multiple filtering operations split across multiple stages. In such examples, the plurality of filtering stages may include a first filtering stage in which a pre-filtering operation is configured to be applied, and a second filtering stage in which a post-filtering operation is configured to be applied. In addition, video decoder 300 may be configured to apply the nonlinear operation in between the various different filtering stages. That is, in an example, video decoder 300 may apply the pre-filtering operation, followed by the nonlinear operation, and followed by the post-filtering operation. In an illustrative example, video decoder 300 may determine that the nonlinear operation includes application of one or more clipping operators. In such instances, video decoder 300 may apply the nonlinear operation following the pre-filtering operation. In such instances, video decoder 300 may or may not apply the post-filtering operation following the nonlinear operation.

In some examples, video decoder 300, when performing the adaptive loop filtering process, may be configured to: apply the combination of the filtering operation and the nonlinear operation to a reconstructed block of the video data to produce a filtered block of the video data. As such, video decoder 300 may output the filtered block to DPB 314.

In some examples, a pre-clipping operation may precede the adaptive loop filtering process. In such instances, the nonlinear operation of the adaptive loop filtering process is separate from the pre-clipping operation. That is, the syntax element defining the adaptive loop filtering process defines the one or more nonlinear operations and the one or more filtering operations of the adaptive loop filtering process, and thus, the adaptive loop filtering process is applied based on the syntax element. In such instances, a separate syntax element may be used to define the pre-clipping operation.

In such examples, the video data is one of a coding block of video data, a slice of video data, a tile of video data, a brick of video data, and/or a picture of video data. That is, video decoder 300 may decode the video data, where the video data may have been encoded by video encoder 200 using a similar adaptive loop filtering process.

As discussed above, the example method of FIG. 15 as described may be performed by one or more processors implemented in circuitry. The one or more processors may be included in a video decoder or in some examples, may be included in a video encoder.

Figure 16:
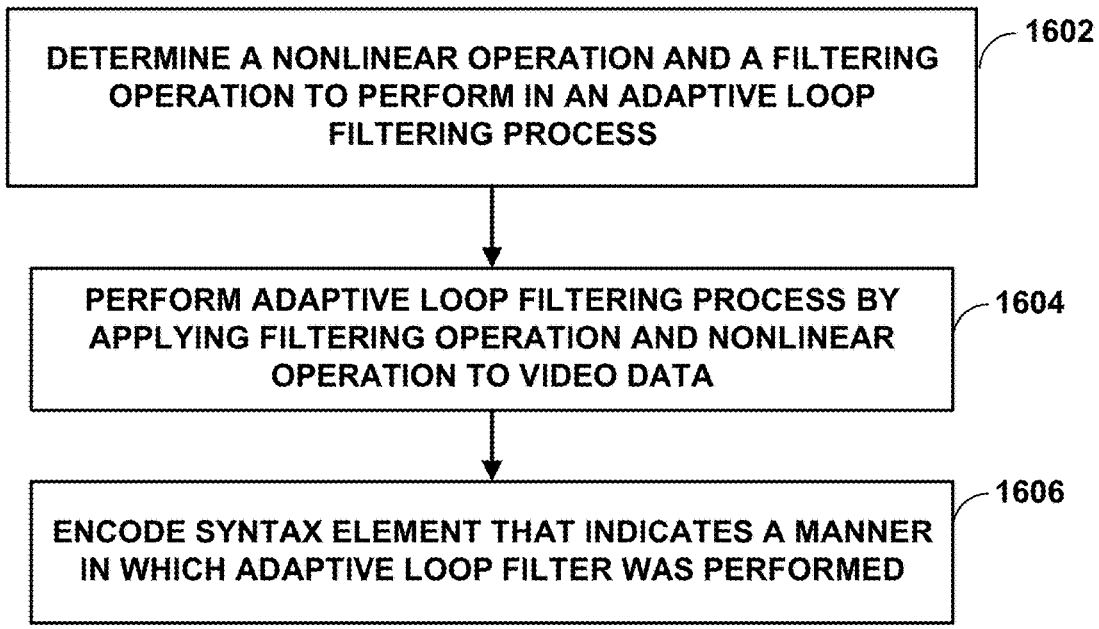
FIG. 16 is a flowchart illustrating an example adaptive loop filtering method, in accordance with one or more of the various techniques disclosed herein.

FIG. 16 is a flowchart illustrating an example adaptive loop filtering method, in accordance with one or more of the various techniques disclosed herein. Although described with respect to video encoder 200 (FIGS. 1 and 3), it should be understood that other devices may be configured to perform a method similar to that of FIG. 16.

In some examples, video encoder 200 may determine a nonlinear operation and a filtering operation to perform in an adaptive loop filtering process (1602). In some examples, video encoder 200 may determine at least one nonlinear operator to apply in an adaptive loop filtering process, where video encoder 200 may perform the adaptive loop filtering process by performing a nonlinear operation that includes application of the at least one nonlinear operator. As described, the adaptive loop filtering process may include a cascade of filtering and nonlinear operations, as well as other permutations that are described in but some examples herein.

In some examples, video encoder 200 may then perform the adaptive loop filtering process by applying the filtering operation and the nonlinear operation to the video data (1604). In an example, video encoder 200 may apply the adaptive loop filtering process, including at least one filtering operation and at least one nonlinear operation to input samples, as described with reference to, for example, FIGS. 10-13.

In some examples, video encoder 200 may encode a syntax element that indicates a manner in which the adaptive loop filtering process was performed (1606). As described herein, the syntax element may include ALF information regarding the nonlinear operation and/or the filtering operation, including coefficients and operation/operator types used in the ALF process.

As discussed above, the example method of FIG. 16 as described may be performed by one or more processors implemented in circuitry. The one or more processors may be included in a video encoder, such as in a combined video encoder-decoder.

Illustrative examples of the disclosure include:

Example 1: An apparatus for decoding video data, the apparatus comprising: a memory configured to store the video data; and one or more processors implemented in circuitry and configured to: decode a syntax element that indicates a manner in which to perform an adaptive loop filtering process, the syntax element indicating that a nonlinear operation is to be applied to the video data, the nonlinear operation configured to be applied in combination with a filtering operation of the adaptive loop filtering process; and perform the adaptive loop filtering process based on the syntax element.

Example 2: An apparatus according to Example 1, wherein the nonlinear operation comprises one or more nonlinear operators that include one or more of: a shrinkage operator, a sigmoid function, or a ReLU function.

Example 3: An apparatus according to any of Examples 1 or 2, wherein the syntax element indicates cascaded versions of the nonlinear operators.

Example 4: An apparatus according to any one of Examples 1 through 3, wherein the syntax element indicates parameters of the nonlinear operation.

Example 5: An apparatus according to any one of Examples 1 through 4, wherein to perform the adaptive loop filtering process, the one or more processors are configured to: determine an order for combining the nonlinear operation and the filtering operation, wherein the order includes applying the nonlinear operation followed by the filtering operation; and apply the nonlinear operation followed by the filtering operation.

Example 6: An apparatus according to any one of Examples 1 through 5, wherein to perform the adaptive loop filtering process, the one or more processors are configured to: determine the nonlinear operation based on sample position, block size, sample value, or color component; and apply the determined nonlinear operation to input samples of the adaptive loop filtering process.

Example 7: An apparatus according to any one of Examples 1 through 6, wherein the filtering operation is predefined or adaptive.

Example 8: An apparatus according to Example 7, wherein the filtering operation is adaptive, and wherein the one or more processors are further configured to: determine one or more filter coefficients for the filtering operation.

Example 9: An apparatus according to any of Examples 7 or 8, wherein the one or more processors are further configured to: determine, from side information, whether or not the filtering operation is predefined or adaptive.

Example 10: An apparatus according to any one of Examples 1 through 6, wherein the one or more processors are configured to apply the filtering operation of the adaptive loop filtering process in a plurality of filtering stages, wherein the plurality of filtering stages include: a first stage in which a pre-filtering operation is configured to be applied before the nonlinear operation, and a second stage in which a post-filtering operation is configured to be applied after the nonlinear operation.

Example 11: An apparatus according to Example 10, wherein to perform the adaptive loop filtering process, the one or more processors are configured to: determine that the nonlinear operation includes application of one or more clipping operators; and apply the nonlinear operation following the pre-filtering operation.

Example 12: An apparatus according to any one of Examples 1 through 6 and 10 or 11, wherein to perform the adaptive loop filtering process, the one or more processors are configured to: apply the combination of the filtering operation and the nonlinear operation to a reconstructed block of the video data to produce a filtered block of the video data; and output the filtered block to a decoded picture buffer (DPB).

Example 13: An apparatus according to any one of Examples 1 through 12, wherein a pre-clipping operation precedes the adaptive loop filtering process, and wherein the nonlinear operation of the adaptive loop filtering process is separate from the pre-clipping operation.

Example 14: An apparatus according to any one of Examples 1 through 13, wherein the video data is one of a coding block of video data, a slice of video data, a tile of video data, a brick of video data, and/or a picture of video data.

Example 15: An apparatus according to any one of Examples 1 through 14, further comprising a display configured to display decoded video data following performance of the adaptive loop filtering process.

Example 16: A method of decoding video data, the method comprising: decoding a syntax element that indicates a manner in which to perform an adaptive loop filtering process, the syntax element indicating that a nonlinear operation is to be applied to the video data, the nonlinear operation configured to be applied in combination with a filtering operation of the adaptive loop filtering process; and performing the adaptive loop filtering process based on the syntax element.

Example 17: A method according to Example 16, wherein the nonlinear operation comprises one or more nonlinear operators that include one or more of: a shrinkage operator, a sigmoid function, or a ReLU function.

Example 18: A method according to any of Examples 16 or 17, wherein the syntax element indicates cascaded versions of the nonlinear operators.

Example 19: A method according to any one of Examples 16 through 18, wherein the syntax element indicates parameters of the nonlinear operation.

Example 20: A method according to any one of Examples 16 through 19, wherein performing the adaptive loop filtering process comprises: determining an order for combining the nonlinear operation and the filtering operation, wherein the order includes applying the nonlinear operation followed by the filtering operation; and applying the nonlinear operation followed by the filtering operation.

Example 21: A method according to any one of Examples 16 through 20, wherein performing the adaptive loop filtering process comprises: determining the nonlinear operation based on sample position, block size, sample value, or color component; and applying the determined nonlinear operation to input samples of the adaptive loop filtering process.

Example 22: A method according to any one of Examples 16 through 21, wherein the filtering operation is predefined or adaptive.

Example 23: A method according to Example 22, wherein the filtering operation is adaptive, and wherein the method further comprises: determining one or more filter coefficients for the filtering operation.

Example 24: A method according to any of Examples 16 through 20, further comprising: determining, based on side information, whether or not the filtering operation is adaptive; and in response to the determination, enabling the adaptive loop filtering process.

Example 25: A method according to any one of Examples 16 through 24, further comprising: applying the filtering operation of the adaptive loop filtering process in a plurality of filtering stages, wherein the plurality of filtering stages include: a first stage in which a pre-filtering operation is configured to be applied before the nonlinear operation, and a second stage in which a post-filtering operation is configured to be applied after the nonlinear operation.

Example 26: A method according to any one of Examples 16 through 25, wherein performing the adaptive loop filtering process comprises: determining that the nonlinear operation includes application of one or more clipping operators; and applying the nonlinear operation following the pre-filtering operation.

Example 27: A method according to any one of Examples 16 through 26, wherein performing the adaptive loop filtering process comprises: applying the combination of the filtering operation and the nonlinear operation to a reconstructed block of the video data to produce a filtered block of the video data; and outputting the filtered block to a decoded picture buffer (DPB).

Example 28: A method according to any one of Examples 16 through 27, wherein a pre-clipping operation precedes the adaptive loop filtering process, and wherein the nonlinear operation of the adaptive loop filtering process is separate from the pre-clipping operation.

Example 29: A method according to any one of Examples 16 through 28, wherein the video data is one of a coding block of video data, a slice of video data, a tile of video data, a brick of video data, and/or a picture of video data.

Example 30: An apparatus for encoding video data, the apparatus comprising: a memory configured to store the video data; and one or more processors implemented in circuitry and configured to: determine a nonlinear operation and a filtering operation to perform in an adaptive loop filtering process; perform the adaptive loop filtering process by applying the filtering operation and the nonlinear operation to the video data; and encode a syntax element that indicates a manner in which the adaptive loop filtering process was performed.

Example 31: An apparatus according to Example 30, wherein to encode the syntax element, the one or more processors are configured to: encode the syntax element to indicate the filtering operation or the nonlinear operation as a first operation of the adaptive loop filtering process.

Example 32: An apparatus according to any one of Examples 30 or 31, wherein to encode the syntax element, the one or more processors are configured to: encode the syntax element to indicate a composition order for the filtering operation and the nonlinear operation.

In some implementations, the above-described Examples 1-15, 16-29, and/or 30-32 can be implemented using an apparatus comprising one or more means for performing some or all of the various operations. In an Example 33, an apparatus for decoding video data includes: means for decoding a syntax element that indicates a manner in which to perform an adaptive loop filtering process, the syntax element indicating that a nonlinear operation is to be applied to the video data, the nonlinear operation configured to be applied in combination with a filtering operation of the adaptive loop filtering process; and means for performing the adaptive loop filtering process based on the syntax element.

Example 34: An apparatus according to Example 33, wherein the means for performing the adaptive loop filtering process comprises: means for applying the nonlinear operation; and means for applying the filtering operation following the nonlinear operation.

Example 35: An apparatus according to any of Examples 33 or 34, further comprising: means for applying the filtering operation of the adaptive loop filtering process in a plurality of filtering stages that are separated by the nonlinear operation.

Example 36: An apparatus according to any one of Examples 33 through 35, wherein the means for performing the adaptive loop filtering process comprises: means for applying the nonlinear operation to a reconstructed block of the video data.

In some implementations, the above-described Examples 1-15, 16-29, and/or 30-32 can be implemented using a computer-readable storage medium storing instructions that when executed cause one or more processors of a device to perform some or all of the various operations. In an Example 37, a computer-readable storage medium can be provided storing instructions that when executed cause one or more processors of a device for decoding and/or encoding video data to: decode a syntax element that indicates a manner in which to perform an adaptive loop filtering process, the syntax element indicating that a nonlinear operation is to be applied to video data in combination with a filtering operation; and perform the adaptive loop filtering process based on the syntax element.

Example 38: A non-transitory computer-readable storage medium according to Example 37, wherein the nonlinear operation comprises one or more nonlinear operators that include one or more of: a shrinkage operator, a sigmoid function, or a ReLU function.

Example 39: A non-transitory computer-readable storage medium according to any of Examples 37 or 38, wherein the instructions, when executed, cause the one or more processors to: apply the filtering operation and the nonlinear operation to a reconstructed block of the video data to produce a filtered block of the video data.

Example 40: A non-transitory computer-readable storage medium according to any one of Examples 37 through 39, wherein the instructions, when executed, cause the one or more processors to: determine one or more filtering coefficients for the filtering operation; and determine one or more parameters for the nonlinear operation.

Example 41: A non-transitory computer-readable storage medium according to any one of Examples 37 through 40, wherein the instructions, when executed, cause the one or more processors to: determine an order for combining the nonlinear operation and the filtering operation.

Example 42: A method of coding video data, the method comprising: coding a syntax element indicating one of a plurality of adaptive loop filtering processes for video data, wherein the plurality of adaptive loop filtering processes include (a) a single filtering operation, (b) a nonlinear operation followed by a filtering operation, and (c) a pre-filtering operation, followed by a nonlinear operation, followed by a post-filtering operation; and applying the indicated adaptive loop filtering processes to the video data based on the syntax element.

Example 43: A method according to Example 42, wherein the syntax element indicates cascaded versions of adaptive loop filtering processes (a), (b), and/or (c).

Example 44: A method according to any of Examples 42 or 43, wherein one or more of the single filtering operation, the pre-filtering operation, or the post-filtering operation are predefined.

Example 45: A method according to any one of Examples 42 through 44, wherein one or more of the single filtering operation, the pre-filtering operation, or the post-filtering operation are adaptive, the method further comprising: receiving one or more of filtering parameters or filter coefficients for one or more of the single filtering operation, the pre-filtering operation, or the post-filtering operation.

Example 46: A method according to any one of Examples 42 through 45, wherein one or more of the single filtering operation, the pre-filtering operation, or the post-filtering operation are adaptive and one or more of the single filtering operation, the pre-filtering operation, or the post-filtering operation are predefined, the method further comprising: receiving a second syntax element indicating whether or not the single filtering operation, the pre-filtering operation, or the post-filtering operation is adaptive.

Example 47: A method according to any one of Examples 42 through 46, wherein one or more of the single filtering operation, the pre-filtering operation, or the post-filtering operation are adaptive and one or more of the single filtering operation, the pre-filtering operation, or the post-filtering operation are predefined, the method further comprising: inferring whether or not the single filtering operation, the pre-filtering operation, or the post-filtering operation is predefined or adaptive based on side information.

Example 48: A method according to Example 47, wherein the side information includes classification information.

Example 49: A method according to any one of Examples 42 through 48, wherein the video data is one of a block of video data, a slice of video data, a tile of video data, a brick of video data, and/or a picture of video data.

Example 50: A method according to any one of Examples 42 through 49, wherein the nonlinear operation is one or more of a clipping operation, a shrinkage operation, a sigmoid function, or a ReLU function.

Example 51: A method according to any one of Examples 42 through 50, wherein coding comprises decoding.

Example 52: A method according to any one of Examples 42 through 51, wherein coding comprises encoding.

Example 53: A device for coding video data, the device comprising one or more means for performing the method of any one of Examples 42 through 52.

Example 54: A device according to Example 53, wherein the one or more means comprise one or more processors implemented in circuitry.

Example 55: A device according to any one of Examples 53 or 54, further comprising a memory to store the video data.

Example 56: A device according to any one of Examples 53 through 55, further comprising a display configured to display decoded video data.

Example 57: A device according to any one of Examples 53 through 56, wherein the device comprises one or more of a camera, a computer, a mobile device, a broadcast receiver device, or a set-top box.

Example 58: A device according to any one of Examples 53 through 57, wherein the device comprises a video decoder.

Example 59: A device according to any one of Examples 53 through 58, wherein the device comprises a video encoder.

Example 60: A computer-readable storage medium having stored thereon instructions that, when executed, cause one or more processors to perform the method of any one of Examples 42 through 52.

Example 61: Any combination of techniques described in the disclosure.

In some implementations, the above-described Examples 42 through 52 and/or 53 through 59 can be implemented using a computer-readable storage medium storing instructions that when executed cause one or more processors of a device to perform some or all of the various operations. For example, a computer-readable storage medium can be provided storing instructions that when executed cause one or more processors of a device for decoding and/or encoding video data to: code a syntax element indicating one of a plurality of adaptive loop filtering processes for video data, wherein the plurality of adaptive loop filtering processes include (a) a single filtering operation, (b) a nonlinear operation followed by a filtering operation, and (c) a pre-filtering operation, followed by a nonlinear operation, followed by a post-filtering operation; and apply the indicated adaptive loop filtering processes to the video data based on the syntax element.

In some implementations, the above-described Examples 42 through 52 and/or 53 through 59 can be implemented using an apparatus comprising one or more means for performing some or all of the various operations. For example, an apparatus for encoding video data includes: means for coding a syntax element indicating one of a plurality of adaptive loop filtering processes for video data, wherein the plurality of adaptive loop filtering processes include (a) a single filtering operation, (b) a nonlinear operation followed by a filtering operation, and (c) a pre-filtering operation, followed by a nonlinear operation, followed by a post-filtering operation; and applying the indicated adaptive loop filtering processes to the video data based on the syntax element.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined CODEC. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a CODEC hardware unit or provided by a collection of interoperative hardware units, including one or more processors as described above, in conjunction with suitable software and/or firmware.

Various examples have been described. These and other examples are within the scope of the following claims.

What is claimed is:

1. An apparatus for decoding video data, the apparatus comprising:
a memory configured to store the video data; and
one or more processors implemented in circuitry and configured to:
decode a syntax element that indicates an adaptive loop filtering process from among a plurality of adaptive loop filtering processes, wherein at least two of the plurality of adaptive loop filtering processes include application of a respective nonlinear operation in combination with a filtering operation, and wherein at least one of the plurality of adaptive loop filtering processes includes a first stage in which a pre filtering operation is configured to be applied before the respective nonlinear operation, and further includes a second stage in which a post filtering operation is configured to be applied after the respective nonlinear operation; and
perform, on the video data, the adaptive loop filtering process indicated by the syntax element.

2. The apparatus of claim 1, wherein the syntax element indicates one of the plurality of adaptive loop filtering processes that includes the application of the respective nonlinear operation and the filtering operation, and wherein the respective nonlinear operation comprises one or more nonlinear operators that include one or more of: a shrinkage operator, a sigmoid function, or a ReLU function.

3. The apparatus of claim 2, wherein the syntax element indicates cascaded versions of the nonlinear operators in combination with the filtering operation.

4. The apparatus of claim 1, wherein the syntax element indicates one of the plurality of adaptive loop filtering processes that includes the application of the respective nonlinear operation and the filtering operation, and wherein the syntax element further indicates parameters of the respective nonlinear operation.

5. The apparatus of claim 1, wherein the syntax element indicates one of the plurality of adaptive loop filtering processes that includes the application of the respective nonlinear operation and the filtering operation, and wherein to perform the adaptive loop filtering process, the one or more processors are configured to:
determine an order for combining the respective nonlinear operation and the filtering operation, wherein the order includes applying the respective nonlinear operation followed by the filtering operation; and
apply the respective nonlinear operation followed by the filtering operation.

6. The apparatus of claim 1, wherein the syntax element indicates one of the plurality of adaptive loop filtering processes that includes the application of the respective nonlinear operation and the filtering operation, and wherein to perform the adaptive loop filtering process, the one or more processors are configured to:
determine the respective nonlinear operation based on sample position, block size, sample value, or color component; and
apply the respective nonlinear operation to input samples of the adaptive loop filtering process.

7. The apparatus of claim 1, wherein to perform the adaptive loop filtering process, the one or more processors are configured to: determine that the respective nonlinear operation includes application of one or more clipping operators; and apply the respective nonlinear operation following the pre filtering operation.

8. The apparatus of claim 1, wherein the syntax element indicates one of the plurality of adaptive loop filtering processes that includes the application of the respective nonlinear operation and the filtering operation, and wherein to perform the adaptive loop filtering process, the one or more processors are configured to:
apply the filtering operation and the respective nonlinear operation to a reconstructed block of the video data to produce a filtered block of the video data; and
output the filtered block to a decoded picture buffer (DPB).

9. The apparatus of claim 1, wherein the syntax element indicates one of the plurality of adaptive loop filtering processes that includes the application of the respective nonlinear operation and the filtering operation, and wherein the one or more processors are further configured to:
perform a pre clipping operation that precedes the adaptive loop filtering process, wherein the respective nonlinear operation of the adaptive loop filtering process is separate from the pre clipping operation.

10. The apparatus of claim 1, wherein the video data is one of a coding block of video data, a slice of video data, a tile of video data, a brick of video data, and/or a picture of video data.

11. The apparatus of claim 1, further comprising a display configured to display decoded video data following performance of the adaptive loop filtering process.

12. A method of decoding video data, the method comprising:
decoding a syntax element that indicates an adaptive loop filtering process from among a plurality of adaptive loop filtering processes, wherein at least two of the plurality of adaptive loop filtering processes include application of a respective nonlinear operation in combination with a filtering operation, and wherein at least one of the plurality of adaptive loop filtering processes includes a first stage in which a pre filtering operation is configured to be applied before the respective nonlinear operation, and further includes a second stage in which a post filtering operation is configured to be applied after the respective nonlinear operation; and
performing, on the video data, the adaptive loop filtering process indicated by the syntax element.

13. The method of claim 12, wherein the syntax element indicates one of the plurality of adaptive loop filtering processes that includes the application of the respective nonlinear operation and the filtering operation, and wherein the respective nonlinear operation comprises one or more nonlinear operators that include one or more of: a shrinkage operator, a sigmoid function, or a ReLU function.

14. The method of claim 13, wherein the syntax element indicates cascaded versions of the nonlinear operators in combination with the filtering operation.

15. The method of claim 12, wherein the syntax element indicates one of the plurality of adaptive loop filtering processes that includes the application of the respective nonlinear operation and the filtering operation, and wherein the syntax element further indicates parameters of the nonlinear operation.

16. The method of claim 12, wherein the syntax element indicates one of the plurality of adaptive loop filtering processes that includes the application of the respective nonlinear operation and the filtering operation, and wherein performing the adaptive loop filtering process comprises:
   determining an order for combining the respective nonlinear operation and the filtering operation, wherein the order includes applying the respective nonlinear operation followed by the filtering operation; and
   applying the respective nonlinear operation followed by the filtering operation.

17. The method of claim 12, wherein the syntax element indicates one of the plurality of adaptive loop filtering processes that includes the application of the respective nonlinear operation and the filtering operation, and wherein performing the adaptive loop filtering process comprises:
   determining the respective nonlinear operation based on sample position, block size, sample value, or color component; and
   applying the respective nonlinear operation to input samples of the adaptive loop filtering process.

18. The method of claim 12, further comprising:
   determining, based on side information, whether or not the filtering operation is adaptive; and
   in response to the determination, enabling the adaptive loop filtering process.

19. The method of claim 12, wherein the syntax element indicates one of the plurality of adaptive loop filtering processes that includes the application of the respective nonlinear operation and the filtering operation, and wherein performing the adaptive loop filtering process comprises: determining that the respective nonlinear operation includes application of one or more clipping operators; and applying the respective nonlinear operation following the pre filtering operation.

20. The method of claim 12, wherein the syntax element indicates one of the plurality of adaptive loop filtering processes that includes the application of the respective nonlinear operation and the filtering operation, and wherein performing the adaptive loop filtering process comprises:
   applying the filtering operation and the respective nonlinear operation to a reconstructed block of the video data to produce a filtered block of the video data; and
   outputting the filtered block to a decoded picture buffer (DPB).

21. The method of claim 12, wherein the syntax element indicates one of the plurality of adaptive loop filtering processes that includes the application of the respective nonlinear operation and the filtering operation, the method further comprising:
   performing a pre clipping operation that precedes the adaptive loop filtering process, wherein the respective nonlinear operation of the adaptive loop filtering process is separate from the pre clipping operation.

22. The method of claim 12, wherein the video data is one of a coding block of video data, a slice of video data, a tile of video data, a brick of video data, and/or a picture of video data.

23. An apparatus for encoding video data, the apparatus comprising:
   a memory configured to store the video data; and
   one or more processors implemented in circuitry and configured to:
      determine an adaptive loop filtering process from among a plurality of adaptive loop filtering processes, wherein at least two of the plurality of adaptive loop filtering processes include application of a respective non-linear operation in combination with a filtering operation, and wherein at least one of the plurality of adaptive loop filtering processes includes a first stage in which a pre filtering operation is configured to be applied before the respective nonlinear operation, and further includes a second stage in which a post filtering operation is configured to be applied after the respective nonlinear operation;
      perform, on the video data, the adaptive loop filtering process; and
      encode a syntax element that indicates the adaptive loop filtering process from among the plurality of adaptive loop filtering processes.

24. The apparatus of claim 23, wherein to encode the syntax element, the one or more processors are configured to:
   encode the syntax element to indicate the filtering operation or the respective nonlinear operation as a first operation of the adaptive loop filtering process.

25. The apparatus of claim 23, wherein to encode the syntax element, the one or more processors are configured to:
   encode the syntax element to indicate a composition order for the filtering operation and the respective nonlinear operation.

26. An apparatus for decoding video data, the apparatus including:
   means for decoding a syntax element that indicates an adaptive loop filtering process from among a plurality of adaptive loop filtering processes, wherein at least two of the plurality of adaptive loop filtering processes include application of a respective nonlinear operation in combination with a filtering operation, and wherein at least one of the plurality of adaptive loop filtering processes includes a first stage in which a pre filtering operation is configured to be applied before the respective nonlinear operation, and further includes a second stage in which a post filtering operation is configured to be applied after the respective nonlinear operation; and
   means for performing, on the video data, the adaptive loop filtering process indicated by the syntax element.

27. A non-transitory computer-readable storage medium having stored thereon instructions that, when executed, cause one or more processors to:
   decode a syntax element that indicates an adaptive loop filtering process from among a plurality of adaptive loop filtering processes, wherein at least two of the plurality of adaptive loop filtering processes include application of a respective nonlinear operation in combination with a filtering operation, and wherein at least one of the plurality of adaptive loop filtering processes includes a first stage in which a pre filtering operation is configured to be applied before the respective nonlinear operation, and further includes a second stage in which a post filtering operation is configured to be applied after the respective nonlinear operation; and perform, on video data, the adaptive loop filtering process indicated by the syntax element.

28. The non-transitory computer-readable storage medium of claim 27, wherein the syntax element indicates one of the plurality of adaptive loop filtering processes that includes the application of the respective nonlinear operation and the filtering operation, and wherein the respective nonlinear operation comprises one or more nonlinear operators that include one or more of: a shrinkage operator, a sigmoid function, or a ReLU function.

29. The non-transitory computer-readable storage medium of claim 27, wherein the syntax element indicates one of the plurality of adaptive loop filtering processes that includes the application of the respective nonlinear operation and the filtering operation, and wherein the instructions, when executed, cause the one or more processors to:

apply the filtering operation and the respective nonlinear operation to a reconstructed block of the video data to produce a filtered block of the video data.

30. The non-transitory computer-readable storage medium of claim 27, wherein the syntax element indicates one of the plurality of adaptive loop filtering processes that includes the application of the respective nonlinear operation and the filtering operation, and wherein the instructions, when executed, cause the one or more processors to:

determine one or more filtering coefficients for the filtering operation; and determine one or more parameters for the respective nonlinear operation.

31. The non-transitory computer-readable storage medium of claim 27, wherein the syntax element indicates one of the plurality of adaptive loop filtering processes that includes the application of the respective nonlinear operation and the filtering operation, and wherein the instructions, when executed, cause the one or more processors to:

determine an order for combining the respective nonlinear operation and the filtering.

32. The apparatus of claim 1, wherein at least one of the plurality of adaptive loop filtering processes includes the filtering operation applied alone.

33. The method of claim 12, wherein at least one of the plurality of adaptive loop filtering processes includes the filtering operation applied alone.

34. The apparatus of claim 23, wherein at least one of the plurality of adaptive loop filtering processes includes the filtering operation applied alone.

* * * * *